US011231311B2

(12) United States Patent
Heim et al.

(10) Patent No.: US 11,231,311 B2
(45) Date of Patent: Jan. 25, 2022

(54) NON-LINEAR ULTRASOUND METHOD AND APPARATUS FOR QUANTITATIVE DETECTION OF MATERIALS

(71) Applicant: PERCEPTIVE SENSOR TECHNOLOGIES LLC, Tucson, AZ (US)

(72) Inventors: James M. Heim, Tucson, AZ (US); Earl J. Crochet, Humble, TX (US); William Coleman, Tucson, AZ (US); Joel Burcham, Huntsville, AL (US); Lazar Bivolarsky, Cupertino, CA (US)

(73) Assignee: PERCEPTIVE SENSOR TECHNOLOGIES LLC, Tucson, AZ (US)

( * ) Notice: Subject to any disclaimer, the term of this patent is extended or adjusted under 35 U.S.C. 154(b) by 0 days.

(21) Appl. No.: 16/914,092

(22) Filed: Jun. 26, 2020

(65) Prior Publication Data
US 2020/0378818 A1    Dec. 3, 2020

Related U.S. Application Data

(63) Continuation-in-part of application No. 16/888,469, filed on May 29, 2020, now Pat. No. 10,996,089.
(Continued)

(51) Int. Cl.
*G01F 23/296* (2006.01)
*G08B 21/18* (2006.01)

(52) U.S. Cl.
CPC ......... *G01F 23/2965* (2013.01); *G08B 21/18* (2013.01)

(58) Field of Classification Search
CPC .................. G01F 23/2965; G08B 21/18
See application file for complete search history.

(56) References Cited

U.S. PATENT DOCUMENTS

| 2,449,054 A | 9/1948 | Chantlin | 177/311 |
| 3,703,829 A | 11/1972 | Dougherty | 73/290 |

(Continued)

FOREIGN PATENT DOCUMENTS

WO    WO 2007/149605    12/2007

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14pgs.

(Continued)

*Primary Examiner* — Nay Tun
(74) *Attorney, Agent, or Firm* — Hayes Soloway P.C.

(57) ABSTRACT

Systems and methods for determining a fill level of a fluid within a fluid vessel, an identity of the fluid, and/or a condition of the vessel wall are disclosed. To determine a fluid fill level, at least one acoustic sensor is positionable substantially on an exterior sidewall of a vessel containing fluid. A computerized device is in communication with the at least one acoustic sensor. A processor of the computerized device receives a detection signal from the at least one acoustic sensor and communicates an alert of the detection signal, which can be used to identify a fill level of the fluid. The detection signal, along with other measured information, can be used to identify the material type of the fluid. A condition of the vessel wall may be determined based on an attenuation signal when two acoustic sensors are used, one being positioned angular to the vessel wall.

19 Claims, 14 Drawing Sheets

Related U.S. Application Data

(60) Provisional application No. 62/867,093, filed on Jun. 26, 2019, provisional application No. 62/855,514, filed on May 31, 2019.

(56) References Cited

U.S. PATENT DOCUMENTS

| | | | | |
|---|---|---|---|---|
| 4,182,177 | A * | 1/1980 | Prough | G01F 23/2961 73/290 V |
| 4,280,126 | A * | 7/1981 | White | G01F 23/2961 340/621 |
| 4,320,659 | A * | 3/1982 | Lynnworth | G01F 1/66 73/290 V |
| 4,676,098 | A * | 6/1987 | Erlenkamper | B65D 90/48 73/290 V |
| 4,934,191 | A * | 6/1990 | Kroening | G01N 29/02 73/592 |
| 5,015,995 | A * | 5/1991 | Holroyd | G01F 23/2965 340/621 |
| 5,038,611 | A * | 8/1991 | Weldon | G01F 23/2962 73/290 V |
| 5,295,120 | A * | 3/1994 | McShane | G10K 11/002 367/188 |
| 5,325,727 | A | 7/1994 | Miller et al. | G01F 1/34 |
| 5,415,033 | A | 5/1995 | Maresca, Jr. et al. | 73/40.5 |
| 5,438,868 | A * | 8/1995 | Holden | G01F 23/296 342/124 |
| 5,770,806 | A | 6/1998 | Hiismaki | G01F 1/662 |
| 6,157,894 | A | 12/2000 | Hess et al. | 702/54 |
| 6,192,751 | B1 * | 2/2001 | Stein | G01F 23/2962 340/617 |
| 6,330,831 | B1 | 12/2001 | Lynnworth et al. | 73/861.28 |
| 6,470,744 | B1 * | 10/2002 | Usui | B41J 2/17503 73/290 R |
| 6,631,639 | B1 * | 10/2003 | Dam | G01F 23/2961 340/621 |
| 6,925,868 | B2 * | 8/2005 | Young | G01F 23/2966 73/149 |
| 6,938,488 | B2 | 9/2005 | Diaz et al. | 73/597 |
| 7,114,375 | B2 | 10/2006 | Panetta et al. | 73/61.75 |
| 7,246,522 | B1 | 7/2007 | Diaz et al. | 73/597 |
| 7,299,136 | B2 | 11/2007 | DiFoggio et al. | 702/22 |
| 7,694,570 | B1 * | 4/2010 | Dam | G01F 23/2968 73/644 |
| 7,966,882 | B2 | 6/2011 | Greenwood | 73/597 |
| 8,850,882 | B2 * | 10/2014 | Qu | G01F 23/296 73/290 V |
| 8,915,145 | B1 | 12/2014 | Van Orsdol | G01F 1/74 |
| 10,122,051 | B2 * | 11/2018 | Kuhne | H01M 10/399 |
| 11,020,793 | B2 * | 6/2021 | De Monte | B22D 2/006 |
| 2004/0079150 | A1 | 4/2004 | Breed et al. | 73/291 |
| 2004/0173021 | A1 * | 9/2004 | Lizon | G01F 23/2961 73/290 V |
| 2005/0055136 | A1 * | 3/2005 | Hofmann | G01F 23/2965 700/273 |
| 2005/0178198 | A1 * | 8/2005 | Freger | G01F 23/28 73/290 V |
| 2005/0247070 | A1 | 11/2005 | Arshansky et al. | 62/77 |
| 2006/0196224 | A1 | 9/2006 | Esslinger | 62/509 |
| 2007/0157737 | A1 | 7/2007 | Gysling et al. | G01F 1/667 |
| 2010/0199779 | A1 | 8/2010 | Liu et al. | G01F 1/663 |
| 2010/0242593 | A1 * | 9/2010 | Lagergren | G01D 21/00 73/290 V |
| 2011/0029262 | A1 | 2/2011 | Barkhouse | 702/55 |
| 2011/0120218 | A1 * | 5/2011 | Aldridge | G01F 23/2921 73/290 R |
| 2011/0284288 | A1 | 11/2011 | Sawyer et al. | E21B 49/005 |
| 2012/0259560 | A1 * | 10/2012 | Woltring | G01F 23/2962 702/55 |
| 2012/0262472 | A1 * | 10/2012 | Garr | G06T 11/206 345/589 |
| 2013/0080081 | A1 | 3/2013 | Dugger et al. | G01F 1/663 |
| 2013/0128035 | A1 | 5/2013 | Johns et al. | 348/135 |
| 2014/0223992 | A1 | 8/2014 | Harper et al. | G01F 25/0084 |
| 2014/0301902 | A1 * | 10/2014 | Fernald | G01F 23/2961 422/127 |
| 2015/0212045 | A1 | 7/2015 | Raykhman et al. | G01F 1/74 |
| 2015/0247751 | A1 | 9/2015 | Kutlik et al. | G01F 23/2962 |
| 2015/0260003 | A1 | 9/2015 | McHugh et al. | E21B 33/076 |
| 2015/0369647 | A1 | 12/2015 | Kumar et al. | G01F 23/284 |
| 2016/0025545 | A1 | 1/2016 | Saltzgiver et al. | G01F 23/263 |
| 2016/0041024 | A1 * | 2/2016 | Reimer | G01F 23/2962 73/290 V |
| 2016/0146653 | A1 | 5/2016 | Skelding | E21B 21/01 |
| 2016/0169839 | A1 * | 6/2016 | Gottlieb | G01N 29/024 367/7 |
| 2016/0320226 | A1 * | 11/2016 | Schaefer | G01F 23/2962 |
| 2017/0010144 | A1 * | 1/2017 | Lenner | G01S 15/878 |
| 2017/0010145 | A1 * | 1/2017 | Lenner | G01F 23/2962 |
| 2017/0010146 | A1 * | 1/2017 | Kassubek | G01S 7/536 |
| 2017/0059389 | A1 * | 3/2017 | Moore | G08C 17/00 |
| 2017/0082650 | A1 | 3/2017 | Hies et al. | G01F 25/0007 |
| 2017/0102095 | A1 | 4/2017 | Kunita et al. | F16K 37/0091 |
| 2017/0309989 | A1 | 10/2017 | Waelde et al. | H01Q 1/225 |
| 2018/0035603 | A1 * | 2/2018 | Kremmer | A01C 15/006 |
| 2018/0044159 | A1 * | 2/2018 | Crouse | G01F 23/296 |
| 2018/0080809 | A1 * | 3/2018 | Tokarev | G01F 23/2965 |
| 2018/0299317 | A1 | 10/2018 | Truong et al. | G01F 23/2925 |
| 2019/0011304 | A1 * | 1/2019 | Cunningham | G01F 23/2962 |
| 2019/0063984 | A1 * | 2/2019 | Bowley | G01F 23/2962 |
| 2019/0078927 | A1 * | 3/2019 | Takayama | G01F 23/296 |
| 2019/0272496 | A1 * | 9/2019 | Moeller | G01F 23/2962 |
| 2020/0018628 | A1 | 1/2020 | Head et al. | G21C 17/022 |
| 2020/0182736 | A1 | 6/2020 | Kim et al. | G01M 3/2807 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring 2015*, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php.

Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

(56) References Cited

OTHER PUBLICATIONS

"TOPS Terminal Operating Practices Symposium" Program Agenda, Apr. 11, 2018, 1 page.
International Search Report and Written Opinion issued in PCT/US20/35404, dated Aug. 24, 2020, 11 pages.
International Search Report and Written Opinion issued in PCT/US20/39966, dated Sep. 18, 2020, 13 pages.
Office Action issued in U.S. Appl. No. 16/888,469, dated Aug. 5, 2020, 8 pages.
Office Action issued in U.S. Appl. No. 16/888,469, dated Sep. 8, 2020, 20 pages.
U.S. Appl. No. 16/888,469, filed May 29, 2020, Heim.
Hassanzadeh et al., "Investigation of factors affecting on viscosity reduction of sludge from Iranian crude oil storage tanks", Petroleum Science, vol. 15, Jul. 2018, pp. 634-643.
Kak et al., "Principles of Computerized Tomographic Imaging", IEEE, 1988, Chapter 2, 48 pgs.
Pandey, "Ultrasonic attenuation in condensed matter", Dissertation for V.B.S. Purvanchal University, 2009, Chapter 1, 36 pgs.
Zadler, et al., "Resonant Ultrasound Spectroscopy: theory and application", Geophysical Journal International, vol. 156, Issue 1, Jan. 2004, pp. 154-169.
Notice of Allowance issued in U.S. Appl. No. 16/888,469, dated Dec. 23, 2020, 16 pgs.
Office Action issued in U.S. Appl. No. 17/148,122, dated Mar. 2, 2021, 26 pgs.
U.S. Appl. No. 17/148,122, filed Jan. 13, 2021, Heim.
Notice of Allowance issued in U.S. Appl. No. 17/148,122 dated Jun. 16, 2021, 8 pgs.

\* cited by examiner

NON-LINEAR ULTRASOUND METHOD AND APPARATUS FOR QUANTITATIVE DETECTION OF MATERIALS

CROSS REFERENCE TO RELATED APPLICATION

This application is a continuation-in-part application, and claims the benefit of, U.S. application Ser. No. 16/888,469 entitled, "Non-Linear Ultrasound Method and Apparatus for Quantitative Detection of Materials (Liquids, Gas, Plasma)," filed May 29, 2020, now U.S. Pat. No. 10,996,089 issued on May 4, 2021, which claims the benefit of U.S. Provisional Application Ser. No. 62/855,514 entitled "Non Linear Ultrasound Method for Qualitative and Quantitative Detection of Fluid (Liquids, Gas, Plasma) and Localized Structural Health Monitoring of a Container Containing the Fluid", filed May 31, 2019, and this application claims the benefit of U.S. Provisional Application Ser. No. 62/867,093 entitled, "Non Linear Ultrasound Method and System for Detecting Fluid, Structural Materials, and Air within a Vessel" filed Jun. 26, 2019, the entire disclosures of which is incorporated herein by reference.

FIELD OF THE DISCLOSURE

The present disclosure is generally related to material property detection and more particularly is related to a non-linear ultrasound method for quantitative detection of materials.

BACKGROUND OF THE DISCLOSURE

Material level detection, identification and flow measurements are important for a variety of industries. For example, within the fossil fuel processing industry, it is often critical to ensure the correct level of fluid within the storage tank to avoid overfills. One type of fluid flow measurement is fluid metering, which is the measurement of a precise quantity of moving fluid in a specified time period to provide an accurate flow rate of the fluid. Fluid metering is used in a variety of industries which require the monitoring of fluids, including the chemical industry, fossil fuel (oil and gas) processing, and manufacturing. For example, within the fossil fuel processing industry, it is often critical to ensure that the correct amounts and types of materials held in storage vessels or moved through pipelines are precisely combined.

A variety of fluid level detection devices and techniques exist today. Most of these devices are invasive, in that, in order to detect an accurate fill level or an accurate flow of the fluid, these devices must be deployed inside the tank or pipeline. This makes them problematic to service and maintain. For example, mechanical flow meters, which utilize impellers, typically operate by measuring a fluid flow using an arrangement of moving parts, either by passing isolated, known volumes of a fluid through a series of gears or chambers, e.g., through positive displacement, or by means of a spinning turbine or rotor. Mechanical flow meters are generally accurate, in part, due to the ability to accurately measure the number of revolutions of the mechanical components which are used to estimate total volume flow over a short period of time. However, mechanical flow meters must be installed into the pipe subsystem and repair requires shut down of the pipeline, which is highly inefficient and expensive.

Acoustic time-of-flight flow meters are also conventionally used. These devices measure the difference in velocity in two opposite directions on a pipe and then calculate a difference therebetween, where the difference can be used to indicate the speed of material flowing through the pipe. Then, the calculated speed at which the material is traveling can be used, along with the size of the pipe and other parameters to determine volume flow. These conventional acoustic flow meters, however, are often not accurate enough for many industries, including many applications in the fossil fuel industry.

In addition, fluids expand and contract with temperature and most flow meters measure volume flow and do not account for how temperature changes the actual amount of fluid that is in a tank or moving through a pipe. In petroleum products, this can produce inaccurate flow rates on volume of up to 7% based on temperature fluctuations alone.

For fluids stored in tanks, tank fill level sensors can be used to determine a quantity of the fluid. These types of sensors may generally include either radar-based sensors which measure from the top down to the fluid surface, or embedded sensor wires and tubes which are mounted inside the tank. Fill level sensors are not highly accurate for a variety of reasons. Fluids expand and contract with temperature and most fill level sensors do not account for how temperature changes in the liquid affect a fill level. Moreover, fill level sensors must be installed inside tanks or other vessels which makes them problematic to service and maintain.

As mentioned earlier, material level detection, identification and flow measurements are important for a variety of industries to effectively manage assets as well as for operational process control. In the petrochemical industries, it is very common to maintain multiple redundant systems to monitor these metrics to ensure that accurate information is available in the event that one of the units failed.

Further, there are conventional products that are used for testing the walls of tanks for determining wall thickness, the condition of the wall material, any deterioration of the wall and the detection of the presence of any material build-up on the inside of the tank. Testing for wall thickness and deterioration using conventional technology is generally done periodically and, in some situations, requires that the tank be taken out of service for testing. These units inspect a small area of the tank and the tests would need to be repeated on other areas of the tank to get an overall assessment of the walls on each tank. However, these units do not measure the wall condition of the entire continuous tank wall, they do not provide ongoing real-time testing including the detection of material build-up such as wax paraffins—all of which place limitations in terms of usefulness. Additionally, these conventional testing or inspecting units must be operated manually by highly trained personnel which often make them expensive to operate, service, and maintain.

Thus, a heretofore unaddressed need exists in the industry to address the deficiencies and inadequacies.

SUMMARY OF THE DISCLOSURE

Embodiments of the present disclosure provide a system and related method for determining a fill level of a fluid within a fluid vessel. Briefly described, in architecture, one embodiment of the system, among others, can be implemented as follows. A vessel contains a fluid. At least one acoustic sensor is positionable substantially on an exterior sidewall of the vessel. A computerized device is in communication with the at least one acoustic sensor, wherein a processor of the computerized device receives a detection signal from the at least one acoustic sensor and communicates an alert of the detection signal.

The present disclosure can also be viewed as providing a system and related methods for determining a material identity of a fluid being stored in a vessel. Briefly described, in architecture, one embodiment of the system, among others, can be implemented as follows. At least two acoustic sensors are positionable substantially on an exterior sidewall of the vessel having the fluid therein, wherein the two acoustic sensors are positioned at predetermined heights on the vessel. A computerized device is in communication with the at least two acoustic sensors. A processor of the computerized device receives a detection signal from one or more of the at least two acoustic sensors. The computerized device uses the detection signal and measured information of the fluid to derive a temperature-compensated acoustic metric of the fluid which is compared against a material properties database to determine the material identify of the fluid within the vessel.

The present disclosure can also be viewed as providing a system and related methods for determining a condition of a vessel wall. Briefly described, in architecture, one embodiment of the system, among others, can be implemented as follows. A vessel contains a fluid. First and second acoustic sensors are positionable substantially on an exterior sidewall of the vessel. The first and second sensors are each positioned at a predetermined height on the vessel. The second acoustic sensor is positioned angularly relative to the vessel wall. A computerized device is in communication with the two acoustic sensors. A processor of the computerized device receives a detection signal from the first and second acoustic sensors. The detection signal from the first acoustic sensor is used to determine a vessel wall thickness and the detection signal from the second acoustic sensor provides an attenuated signal, wherein the condition of the vessel wall is determinable based on the thickness of the wall and an amount of attenuation in the attenuated signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
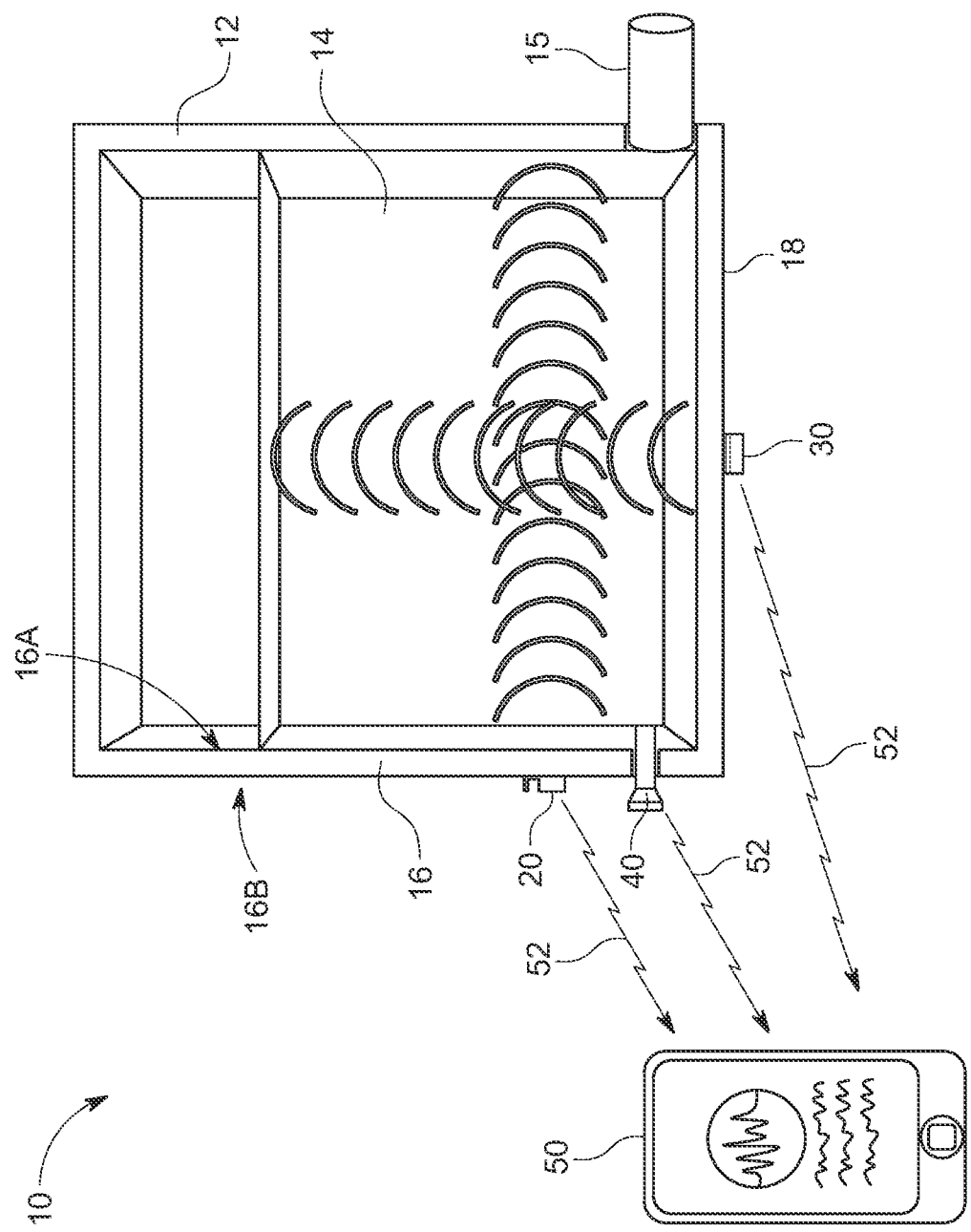
FIG. 1 is an illustration of a system for determining the weight of a quantity of fluid material in a vessel, in accordance with a first exemplary embodiment of the present disclosure.

Embodiments of the present disclosure provide a system and method for determining fluid identification, fluid level and fluid flow by weight. In accordance with this disclosure, the term "material" may be understood to include liquids, gasses, plasmas, or similar materials, or any combination thereof. In one embodiment, the system and method can be used to determine the weight of a quantity of fluid in a vessel. In another embodiment, the system and method can be used to determine the flow rate of a fluid in a pipe using a determined weight of the fluid. The present disclosure may be used to detect the type of the material without physical contact to the material and without chemical analysis. The techniques may utilize non-linear ultrasound which is used to detect the quantitative properties of the material. Other embodiments of the present disclosure can be used where physical contact to the material is made and without chemical analysis. Other embodiments of the present disclosure may be used to detect or monitor the structural health of a container or vessel containing a fluid, such that a crack, corrosion, a change in the thickness of the wall or other structural characteristic of the container can be detected.

It is well known that the density of a material varies with temperature and pressure. This variation is typically small for liquids, but it has been observed that fluid tank levels increase and decrease noticeably with nothing other than temperature changes. Increasing the pressure on a material decreases the volume of the material and thus increases its density. Increasing the temperature of a material (with a few exceptions) decreases its density by increasing its volume. Thus, due to the effect on a material's volume that temperature and pressure can have, determining the weight of a material provides a higher accuracy on the specific quantity of that material. Determining the weight of a material serves several other benefits as well. Materials are sold around the world by weight. While changes in temperature result in changes in pressure and/or volume of a material, the weight, or mass in gravity, of a material does not change due to changes in temperature, pressure, or density. Thus, determining the weight of a material may provide a more accurate way to measure or confirm the quantity of material during a commercial transaction.

The subject disclosure is directed to the use of material metering to determine product flow rates of material by using acoustics, which in turn, can be used to determine changes in weight of material being transferred. The result is that the ability to provide highly accurate measurements of material flow rate by calculating the change in weight of the material on a periodic basis, e.g., at predetermined time intervals over a historic time period. For example, using acoustics to measure the weight of the material stored inside a tank or container every ten seconds can be used to provide the net change in material over a specific period, e.g., one minute, which can indicate a flow rate of the product leaving or entering the tank or pipe.

FIG. 1 is an illustration of a system 10 for determining a weight of a quantity of fluid material in a vessel, in accordance with a first exemplary embodiment of the present disclosure. The system 10 for determining the weight of the quantity of fluid, which may be referred to herein simply as 'system 10' may be attached to the wall 16 of a vessel 12 containing the fluid 14. A first acoustic sensor 20 is located along a wall 16 of the vessel 12. A second acoustic sensor 30 is located along a bottom wall 18 of the vessel 12, wherein the second acoustic sensor 30 measures a fill level of the fluid 14 in the vessel 12. A temperature sensor 40 is located on, near, or within the vessel 12, wherein the temperature sensor 40 measures a temperature of the fluid 14.

It is desirable to determine the weight of the fluid 14 because the weight is a highly accurate parameter to determine other characteristics of the fluid 14, such as a flow rate of fluid 14 out of or in to the vessel 12, such as through an outlet or inlet pipe 15. Within the chemical and fossil fuel industry, weight is considered the most accurate means of material measurement, easily surpassing volume or a measured quantity, such as liters, gallons, or barrels. Indeed, tanker shipments of petroleum products are measured in metric tons not by the barrel.

In operation, the system 10 may be used with a quantity of fluid 14 where the specific fluid type is either known or unknown. For example, the vessel 12 may be filled with a fluid 14 which is specifically known to be a certain chemical or substance, or the type of fluid 14 within the vessel 12 may be unknown. If the fluid type is unknown, the first acoustic sensor 20 may be capable of accurately identifying the liquid material using known acoustic metrics which are temperature-compensated against a database to identify the specific liquid type.

Once the fluid 14 is identified, or if it is previously known, the second acoustic sensor 30 which is positioned on a bottom wall 18 of the vessel 12 may be used to determine an extremely accurate fill level measurement. In other words, the height of the upper surface of the fluid 14 within the vessel 12 can be determined here. Then, using this determined fill level and engineering information from the vessel 12, e.g., a strapping table or chart which identifies a volumetric quantity of fluid at certain heights or fill levels of the vessel 12, the exact volume of the fluid 14 can be determined. The temperature of the fluid 14 may be taken into consideration at this step, which may be achieved through direct temperature measurement, e.g., from the temperature sensor 40, or from ambient temperature calculation or other techniques. With the type of fluid 14 material identified, the height of the upper surface of the fluid 14 in the vessel 12 and the temperature of fluid 14 may be used to calculate weight.

While it is possible to utilize the acoustic sensor 30 positioned on the bottom wall 18 of the vessel 12 to determine the fill level of the fluid 14 within the vessel 12, it may also be possible to utilize one or more acoustic sensors in other locations on the vessel 12 to determine the fluid 14 fill level. For example, a plurality of acoustic sensors 30 may be positioned on the exterior of the vessel 12 in positions along the lower sidewall 16. These sensors 30 may be oriented at varying angles relative to the height of the vessel 12. For instance, in one example, five or more sensors 30 may be used with orientations of varying angles, such as 15°, 30°, 45°, 60°, and 75°, such that each sensor 30 is positioned to identify the fill level at a particular height in the vessel 12. In another example, sensors 30 may be positioned at spaced distances along the vertical sidewall of the vessel 12, such that each sensor 30 can determine when the fill level of the fluid 14 has moved below the height of the sensor 30, respectively, which can be used to identify fluid 14 fill level within the vessel 12. Any number of sensors in any positions and with any orientations may be used, all combinations of which are considered within the scope of the present disclosure. It may be advantageous to utilize a single acoustic sensor 30 positioned on the bottom wall 18 of the vessel 12, due to efficiency and lower material expense, but vessels 12 which do not allow access to their bottom walls 18, such as those sitting on the ground surface, may be used with the other configurations of sensors to accurately determine a fluid 14 fill level.

If the identity of the fluid 14 material type in the vessel 12 cannot be determined, the density of the fluid 14 can be sensed and determined, and it is possible to calculate the actual weight of the specific fluid 14 based on the sensed and determined density, volume and temperature of the fluid. Using this information, it is then possible to accurately calculate the weight of the fluid 14 at a specific point in time.

The calculations completed by the system 10 may be processed with a computerized device 50 in communication with the first acoustic sensor 20, the second acoustic sensor 30, and the temperature sensor 40. To determine the flow of the fluid 14 by weight, the processor of the computerized device 50 may calculate the weight of the fluid 14 at two or more times, or at predetermined time intervals, based on at least the sensed fill level provided by acoustic sensor 30 and the temperature from temperature sensor 40. The computerized device 50 may receive the sensed information via signals 52 from the sensors, which may be wired, wireless, or any combination thereof. The computerized device 50 may be a hand-held computing device such as a tablet computer, a smart phone, a reader, a laptop, or a stationary computing device, or any other electronic device capable of receiving the signals and calculating the data points using algorithms and processing. The computerized device 50 may include a display screen or GUI which provides relevant information to a human user, or it may be interconnected with another computing device through a network or the Internet to transfer the relevant information elsewhere.

It is also noted that the system 10 can be implemented on vessel 12 without intrusion. The first and second acoustic sensors 20, 30 need only be adhered to the outside of the vessel 12 and the temperature sensor 40 can be located outside or inside the vessel in a convenient position for sensing temperature of the fluid 14. The vessel 12 does not need to be emptied or otherwise opened in order to configure the system 10. Where a vessel 12 is a double-walled vessel, such as shown in FIG. 1, the first and second acoustic sensors 20, 30 may be located on an exterior surface of the vessel 12, or external to an interior surface of the inner sidewall 16A, e.g., in a gap between the inner sidewall 16A and the outer sidewall 16B. The temperature sensor 40 may be placed through the inner and/or outer sidewalls 16A, 16B, e.g., in a position extending from exterior of the vessel 12 to the interior of the vessel 12, such that it can maintain good temperature readings on the fluid 14 within the vessel 12. In other examples, the temperature sensor 40 could be positioned in other locations and would not necessarily need to be in contact with the fluid 14 or the vessel 12. All types of temperature sensors 40 can be used, including infrared temperature sensors, thermistors, other temperature sensing devices, or any combination thereof. Of course, it is also possible for the first and second acoustic sensors 20, 30 and/or the temperature sensor 40 to be mounted within a vessel 12 if it is desired.

Figure 2:
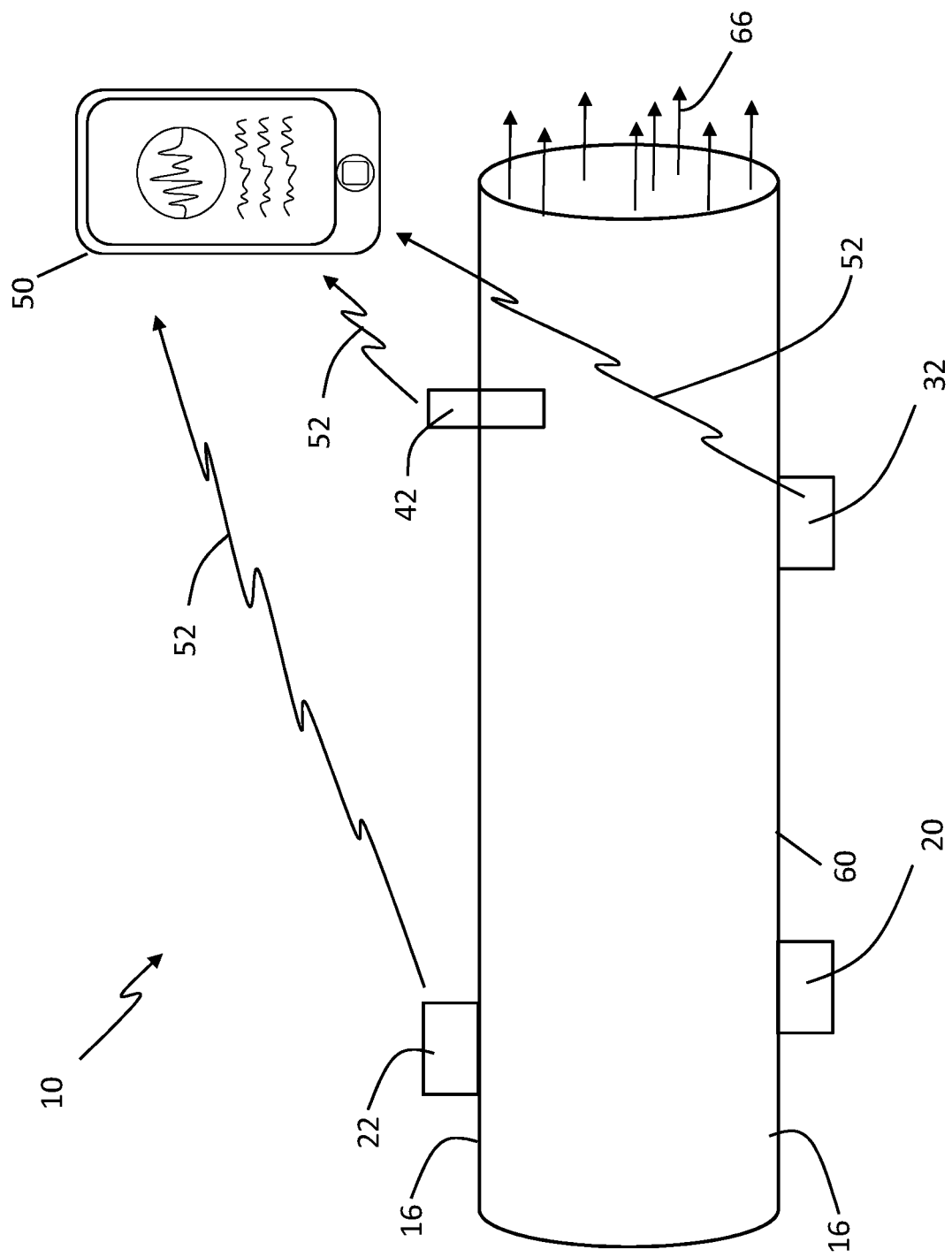
FIG. 2 is an illustration of a system for determining a flow rate for a quantity of fluid within a pipe, in accordance with the first exemplary embodiment of the present disclosure.

In one of many alternative configurations, it may be possible to use multiple acoustic sensors to determine the flow rate of fluid 14 within a vessel 12, in particular, a vessel 12 designed or intended for the transportation of fluid 14, such as a pipe, pipeline, or similar fluid-transporting vessel 12. Similar to the configuration described relative to FIG. 1, the exact flow rates may be determined by weight of fluid. FIG. 2 is an illustration of a system 10 for determining a flow rate for a quantity of fluid within a pipe 60, in accordance with the first exemplary embodiment of the present disclosure. Indeed, FIG. 2 illustrates the system 10 with a pipe 60, which is a vessel which contains and transports the quantity of fluid 66. A first acoustic sensor 22 is located along a wall 16 of the pipe 60, or in a similar position, such as substantially on a wall 16 of the pipe 60. A second acoustic sensor 32 is located along the pipe 60 at a specified or known distance from first sensor 22. A differential time of flight or similar calculation of the fluid 66 in the pipe 60 may be determined using readings of the first acoustic sensor 22 and the second acoustic sensor 32. The differential time of flight may then be used to determine the velocity flow of fluid 66.

In one example, the calculation of the velocity of the material may be determined as follows. The first acoustic sensor 22, i.e., transducer, generates a signal that is received by the second acoustic sensor 32 on the pipe 60. The time taken for the signal to travel from the first acoustic sensor 22 to the second acoustic sensor 32 is known as the Time of Flight (ToF). Then the second acoustic sensor 32 generates a signal which is received from the first acoustic sensor 22 and the difference between the two ToF's is taken as a measure of the velocity of the flow of the material in the pipe 60. From the first acoustic sensor 22 to the second acoustic sensor 32, from the known density of the fluid 66 in the pipe 60, the flow of the material can be calculated:

$$ToF = \frac{D_{tr}}{U_{sp}}$$

Where $D_{tr}$ is the distance between the first and second acoustic sensors 22, 32. Depending on the configuration, this can be equal to the diameter of the pipe 60 or the least distance the signal between will travel between both transducers. $U_{sp}$ is the temperature compensated speed of sound in the material flowing through the pipeline:

$$ToF_1 = \frac{D_{tr}}{U_{sp}^1}$$

$$ToF_2 = \frac{D_{tr}}{U_{sp}^2}$$

Where $U_{sp}^1 = (U_{sp} - V)$ and $U_{sp}^2 = (U_{sp} + V)$, where (V) is the velocity of the material. The velocity can be calculated when the acoustic sensors are on the same side of the pipe 60, in which case, the distance and the component of the speed accounting for the angle of the path the signal travels between the two acoustic sensors and the back wall of the pipe is calculated. $\Delta ToF = (ToF_2 - ToF_1)$ is the time difference between $ToF_1$ and $ToF_2$ $$\Delta ToF = \frac{D_{tr}}{U_{sp}^1} - \frac{D_{tr}}{U_{sp}^2} = \frac{D_{tr}}{(U_{sp} - V)} - \frac{D_{tr}}{(U_{sp} + V)}$$

Rearranging the above equation for velocity, V of the velocity of the material in the pipeline ( ) can be derived from the following equation.

$$V = \Delta ToF * \frac{U_{sp}}{2 * D_{tr}}$$

It is noted that the differential time of flight may be calculated both in a bidirectional manner and/or in a unidirectional manner. For a bidirectional calculation, the differential time of flight of the fluid 66 may be calculated based on readings of the first and second acoustic sensors 22, 32 in two directions of the pipe 60, for example, in both linear forward and backward directions along a flow of the pipe 60. For a unidirectional calculation, the differential time of flight may be calculated by measuring a time of flight in one direction of the pipe 60 and comparing it to an imputed or calculated time of flight based on an acoustic wave velocity of the fluid in a stationary state. As opposed to directly measuring this imputed value of the fluid in a stationary state, this value may be achieved using the fluid 66 material identity and the temperature to derive or lookup the imputed time of flight based on the wave velocity. Then, the wave velocity is applied to the distance between the two acoustic sensors 22, 32 to derive a calculated stationary time of flight. In this way, the time of flight in one direction may be effectively compared to the expected acoustic wave through the fluid 66 when it is in a static or non-moving position within the pipe 60.

A temperature sensor 42 is positioned with pipe 60, wherein the temperature sensor 42 senses a temperature of the fluid 66. While a temperature sensor 42 in physical contact with the pipe 60 may be used, the temperature of the fluid 66 in the pipe 60 may also be provided by alternative methods, including temperature sensing devices which would not necessarily need to be in contact with the fluid 66 or the pipe 60. All types of temperature sensors 42 can be used, including infrared temperature sensors, thermistors, other temperature sensing devices, or any combination thereof.

In addition, multiple calculations can be done during specific time intervals which can be used to determine the flow rate of the fluid 66 during fluctuations in actual flow rates over longer periods of time interval measurements. As a simple example, a straight 2-foot radius pipe has a known diesel (53 lb/ft$^3$ density at 15° C.) flowing at 3 ft/s. The area of the pipe is 12.5 ft$^2$, leading to a flow volume of 37.5 ft$^3$/sec. Multiplying the flow volume by the density provides the weight of the diesel flowing through the pipe at 1,988 lb/s. If at the next measurement the velocity changed to 3.5 ft/s, then the weight of the diesel flowing through the pipe would be an increase to 2,319 lb/s. These calculations can be performed at specific time intervals to identify the changes or fluctuations between the time intervals, which in turn, can be used to determine flow rates over a longer period of time.

These weight-flow measurements may be taken periodically, from every few seconds to every hour, or any other time period. The changes in these weight-flow rates over an extended period of time, which measure the varying amounts of fluid 66 flowing through the pipe 60, provide an accurate normalized calculation of material flow rate by weight. From this information, highly accurate and standardized fluid volume flows, e.g., gallons per hour, etc., and fluid weight flows, e.g., pounds per hour, etc., can be identified.

Moreover, the system 10 can be used to determine the fluid temperature, fluid identity and specific information as to density and weight of the fluid 66 in real-time or substantially real-time, which provides a substantial improvement over other metering devices which do not operate in real-time. It is also noted that the system 10 can be implemented on pipe 60 without intrusion. The first and second acoustic sensors 22, 32 need only be attached to the outside of the pipe 60 and the temperature sensor 42 can be located in a convenient position for sensing temperature. The pipe 60 does not need to be emptied or otherwise opened in order to configure the system 10.

The calculations completed by the system 10 may be processed with a computerized device 50 in communication with the acoustic sensor 20, which determines the identity of the fluid material, and with other acoustic sensors 22, 32, as well as the temperature sensor 42. To determine the flow rate by weight of the fluid 66, the processor of the computerized device 50 may calculate the flow rate by weight of the fluid 66 at predetermined time intervals based on the sensed and determined volume flow rate and fluid density. The computerized device 50 may receive the sensed information via signals 52 from the sensors, which may be wired, wireless, or any combination thereof. The computerized device 50 may be a hand-held computing device such as a tablet computer, a smart phone, a reader, a laptop, a stationary computing device, any other electronic device or service capable of receiving the signals and calculating the data points using algorithms and processing. The computerized device 50 may include a display screen or GUI which provides relevant information to a human user, or it may be interconnected with another computing device through a network, the Internet or cloud service to transfer the relevant information elsewhere.

The system 10 described relative to FIGS. 1-2 may have a variety of uses in a variety of different industries and settings. These may include use in chemical industry or the fossil fuel industry to determine material type based on weight, and/or to determine a flow rate of that material within a vessel or pipe. The system may also find uses in environmental analysis, with recreational items, such as swimming pools, or in other settings. One specific use for the system 10 is with injection units used in the fossil fuel industry. An injection unit may be used to inject a quantity of fluid chemical additives into a petroleum pipeline to protect the pipes in the pipeline against corrosion or for another purpose. The amount of chemical injected may be small, compared to the relative volume of the petroleum in the pipe, but it is often critical to inject the correct amount. Thus, it is imperative to know the exact injection flow rate of the fluid chemical into the pipeline.

Figure 3A:
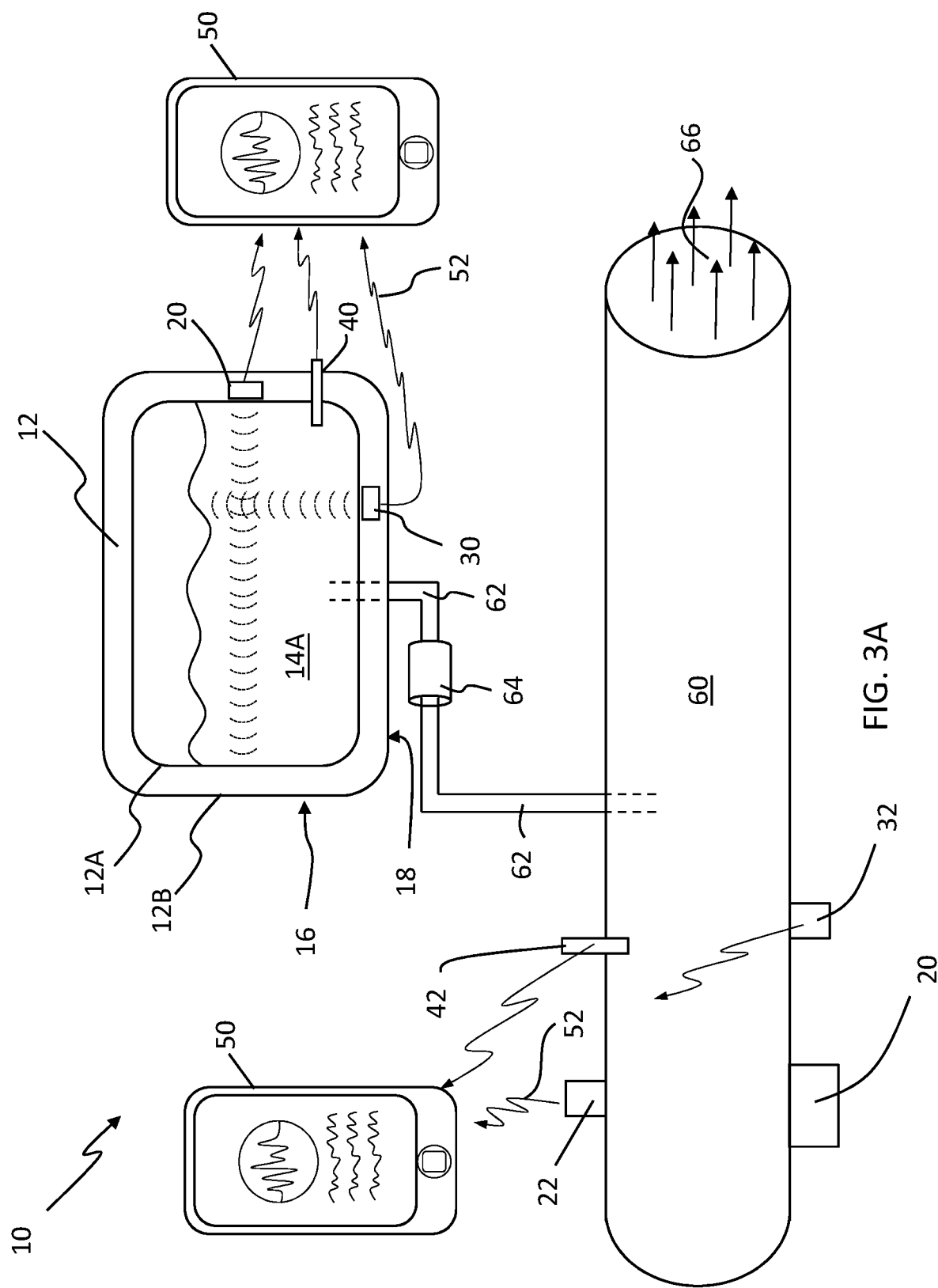
FIG. 3A is an illustration of a system for determining the weight of a quantity of fluid for metering a flow rate of the quantity of fluid to be injected into a pipe using an injection system, in accordance with a second exemplary embodiment of the present disclosure.
Figure 3B:
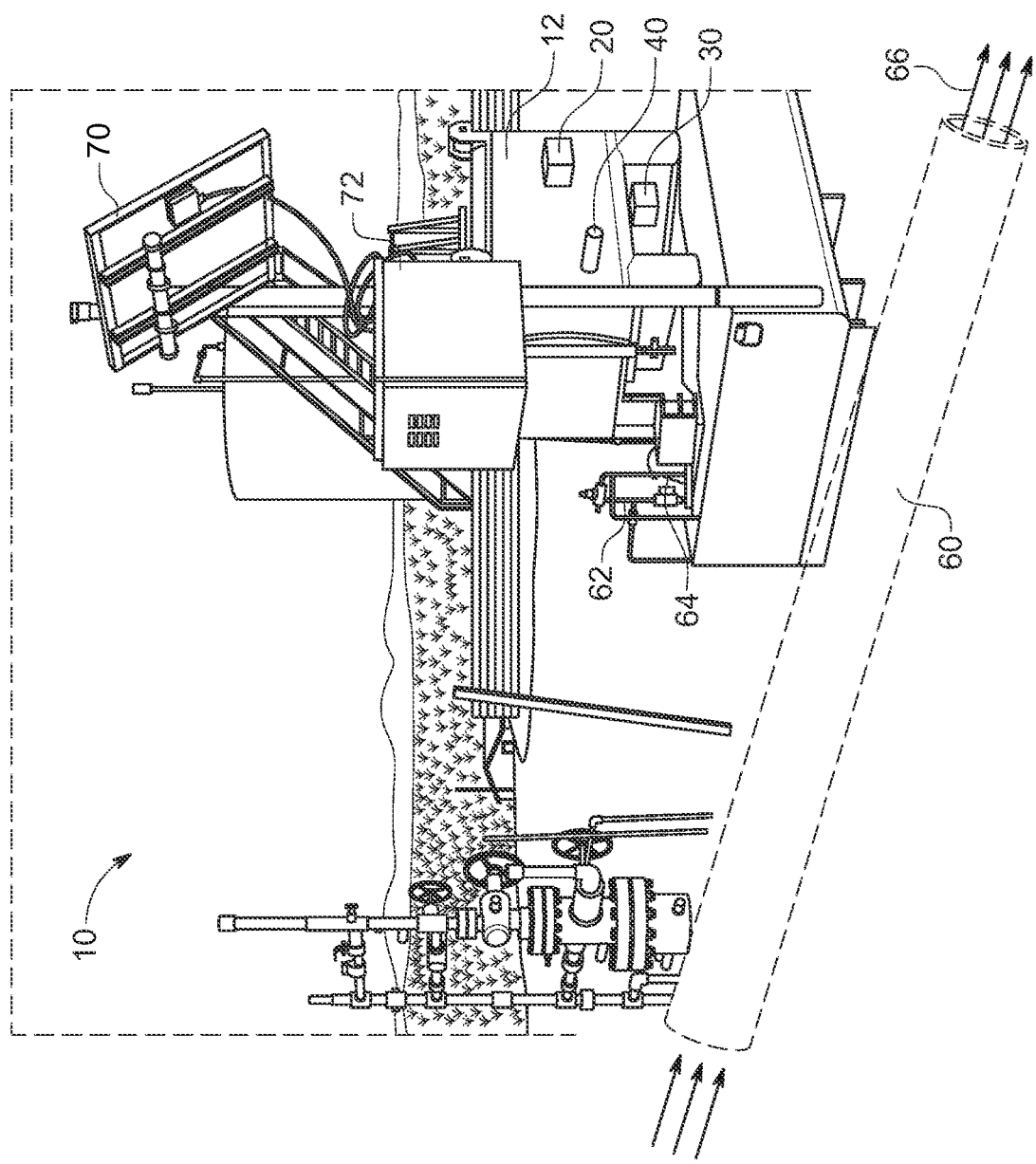
FIG. 3B is an image of an injection system using the system, in accordance with the second exemplary embodiment of the present disclosure.

FIG. 3A is an illustration of a system for determining the weight of a quantity of fluid 14A for metering a flow rate of the quantity of fluid 14A to be injected into a pipe 60 using an injection system, in accordance with a second exemplary embodiment of the present disclosure. FIG. 3B is an image of an injection system using the system 10, in accordance with the second exemplary embodiment of the present disclosure. FIG. 3A illustrates the system 10 depicted and described relative to FIG. 1, which has a vessel 12 containing the quantity of fluid 14A. A first acoustic sensor 20 is located along a sidewall 16 of the vessel 12, and identifies the fluid material. A second acoustic sensor 30 is located along a bottom wall 18 of the vessel 12, wherein the second acoustic sensor 30 senses a fill level of the quantity of fluid 14A in the vessel 12. A temperature sensor 40 is located proximate to the vessel 12, wherein the temperature sensor 40 senses a temperature of the quantity of fluid 14A.

As shown in FIG. 3A, the quantity of fluid 14A, which in this example is a fluid chemical, may be housed within the vessel 12 which is connected to the pipeline 60 through a network of pipes 62, where the fluid chemical 14A is pumped from the vessel 12 with a fluid pump 64. The pipeline 60 may have a quantity of other fluid 66, such as fossil fuels or another fluid, depending on the design and use of the pipeline. The system 10 may be used in a variety of ways to accurately inject the fluid chemical 14A into the pipe 60. For example, as discussed relative to FIG. 1, the first acoustic sensor 20 may sense a material type of the fluid chemical 14A in the vessel 12, while the second acoustic sensor 30 may sense a fill level of the fluid chemical 14A. As the fluid chemical 14A is dispensed via the pipes 62 and pump 64, calculations may be performed by the computerized device 50 sent via signals 52 at varying periods of time or intervals to determine the fill level at each time period. These calculations can then be used to determine the flow rate of the chemical fluid 14A from the vessel 12, which in turn, can be used to control the pump 64 to dispense the fluid chemical 14A into the pipe 60 at the desired rate.

In another example, the acoustic sensors 20, 22, and 32 positioned on or proximate to the pipe 60 may be used to determine the flow rate of the fluid 66 through the pipe 60 using the technique discussed previously relative to FIGS. 1-2, e.g., using the acoustic sensor 20, which determines the fluid identity, and using first and second acoustic sensors 22, 32, which are used to determine the flow rate, along with the temperature sensor 42. When the flow rate of the fluid 66 through the pipe 60 is determined, the system 10 may control the pump 64 to dispense a portion of the fluid chemical 14A from the vessel 12 into the pipe 60. If the flow rate of the fluid 66 within the pipe 60 changes or fluctuates, the system 10 may be able to adjust the flow rate of the chemical fluid 14A from the vessel through the pipes 62 and into the pipe 60, thereby accurately controlling a metering of the flow rate of the fluid chemical 14A into the pipe 60. In this way, the system can dynamically control the injection of the fluid chemical 14A into the pipe 60 to ensure that the desired quantity of fluid chemical 14A is being injected, despite fluctuations in flow rate of the fluid 66 within the pipe 60.

In a third example, the flow rates of the fluid 14A within the vessel 12 or within the pipe 62 and the flow rate of the fluid 66 within the pipe 60 may be determined, such that the pump can be dynamically controlled to continually adjust the rate of injection of the fluid chemical 14A into the pipe 60, and the level of fluid chemical 14A can be monitored to ensure it is not inadvertently depleted. Any combination of these examples may be used to detect the flow rates of fluids 14A, 66 or otherwise control a metering device, such as the pump 64, to inject or transport one fluid to another.

Similar to FIGS. 1-2, the calculations in FIG. 3A completed by the system 10 may be processed with one or more computerized devices 50 in communication with the acoustic sensor 20, which determines the identity of the fluid material in either the vessel 12 or the pipe 60, the acoustic sensor 30 which determines the fill level of the fluid 14A in the vessel 12, and with other acoustic sensors 22, 32 which determine flow rate in the pipe, as well as the temperature sensors 40, 42. While two computerized devices 50 are illustrated in FIG. 3A, any number of computerized devices 50 may be used. The one or more computerized devices 50 may receive the sensed information via signals 52 from the sensors, which may be wired, wireless, or any combination thereof. The one or more computerized devices 50 may be a hand-held computing device such as a tablet computer, a smart phone, a reader, a laptop, a stationary computing device, any other electronic device or service capable of receiving the signals and calculating the data points using algorithms and processing. The one or more computerized devices 50 may include a display screen or GUI which provides relevant information to a human user, or it may be interconnected with another computing device through a network, the Internet or cloud service to transfer the relevant information elsewhere.

One of the many benefits of the system 10 is that it can be used on existing fluid infrastructure without significant alterations. For example, as shown in FIG. 3B, the skid-mounted injection unit may be used in a remote location where petroleum is stored and/or piped through an underground pipe 60. In these types of locations, it is often not possible to access the pipe 60 (shown in broken lines) because it is buried or otherwise not easily accessible. The skid-mounted injection unit may be placed over the pipe 60 such that the chemical additive can be injected at the appropriate location along the pipeline. An electrical power supply may not exist at this remote location, so a solar power source 70 and battery 72 may be used to power the pump 64 which controls injection of the fluid chemical into the pipe 60. The system 10 has low power requirements which can easily be met with the existing solar power source on injection units. Additionally, the sensors of the system 10 can easily be integrated into the existing liquid vessels of injection units, either through retrofit or original manufacture. It is noted, of course, that the system 10 can be used with other petroleum fluid vessels, including tankers, railcars, etc.

Figure 4A:
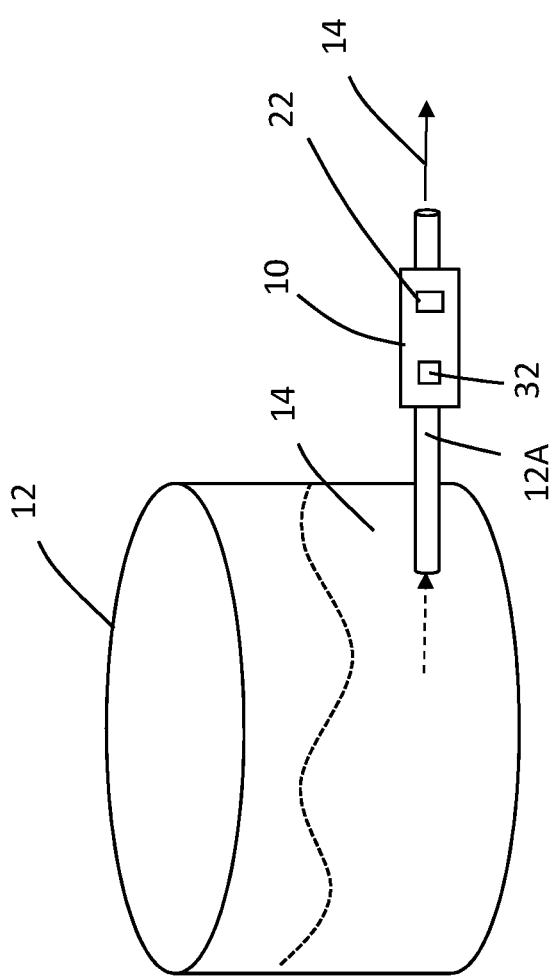
FIG. 4A is an illustration of a system for detecting changes in a flow rate for a quantity of fluid from a vessel, in accordance with the first exemplary embodiment of the present disclosure.
Figure 4B:
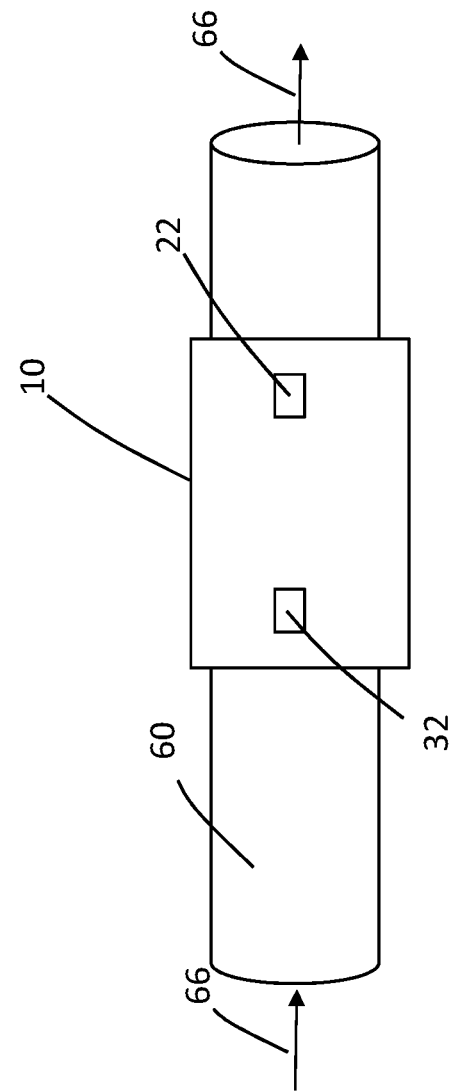
FIG. 4B is an illustration of a system for detecting changes in a flow rate for a quantity of fluid in a pipe, in accordance with the first exemplary embodiment of the present disclosure.

The present disclosure can also provide benefits to fluid flow monitoring in situations where the flow rate (of a fluid through a pipe) changes. FIG. 4A is an illustration of a system for detecting changes in a flow rate for a quantity of fluid 14 from a vessel 12, in accordance with the first exemplary embodiment of the present disclosure. FIG. 4B is an illustration of a system for detecting changes in a flow rate for a quantity of fluid 66 in a pipe 60, in accordance with the first exemplary embodiment of the present disclosure. As shown in both FIGS. 4A-4B, the system 10 may be implemented as a substantially unitary metering device which is positionable around an inlet or outlet pipe 12A of the vessel 12 (FIG. 4A) or around a pipe 60 of a pipeline or another fluid delivery system (FIG. 4B) to monitor for fluid movement. Once any movement of the fluid 14, 66 is detected, the system 10 would measure flow rates. The system 10 may also identify the type of fluid material, if desired, such that complete records of all fluid 14, 66 flows by volume and weight as well as the actual material type can be determined. In both FIGS. 4A-4B, if fluid 14, 66 is not flowing in pipe 12A, 60, the system 10 can ping the first and second acoustic sensors 22 and 32 periodically to determine when the fluid flow starts. The system 10 may be programmed to ping as needed to determine when the flow of fluid 14, 66 stops. The opposite may also be achieved, i.e., where there is an existing flow in the pipe 12A, 60 and the system 10 determines when a fluid flow stops. The ability of system 10 to determine when flow of fluid 14, 66 starts and stops provides additional accuracy in measuring the weight of fluid passing through pipe 12A, 60. Additionally, it is noted that the system 10 may be capable of bidirectional flowrate detection, vessel mass balance capacity, and totalizations in both directions of flow.

As can be understood, the system 10 described herein and related apparatuses and methods may provide substantial benefits to metering flow rates of fluids. To name a few of these benefits, the system can be used to accurately measure fluid transfers from or into tanks, containers or vessels to produce accurate total product movement. The system 10 can also be used to accurately produce custodial transfer documentation of fluid materials between third parties. The system 10 is also capable of being used to accurately identify leaks of liquid material from a tank, container or vessel, as well as accurately monitor inventory liquid materials stored in a tank, container or vessel.

Figure 5A:
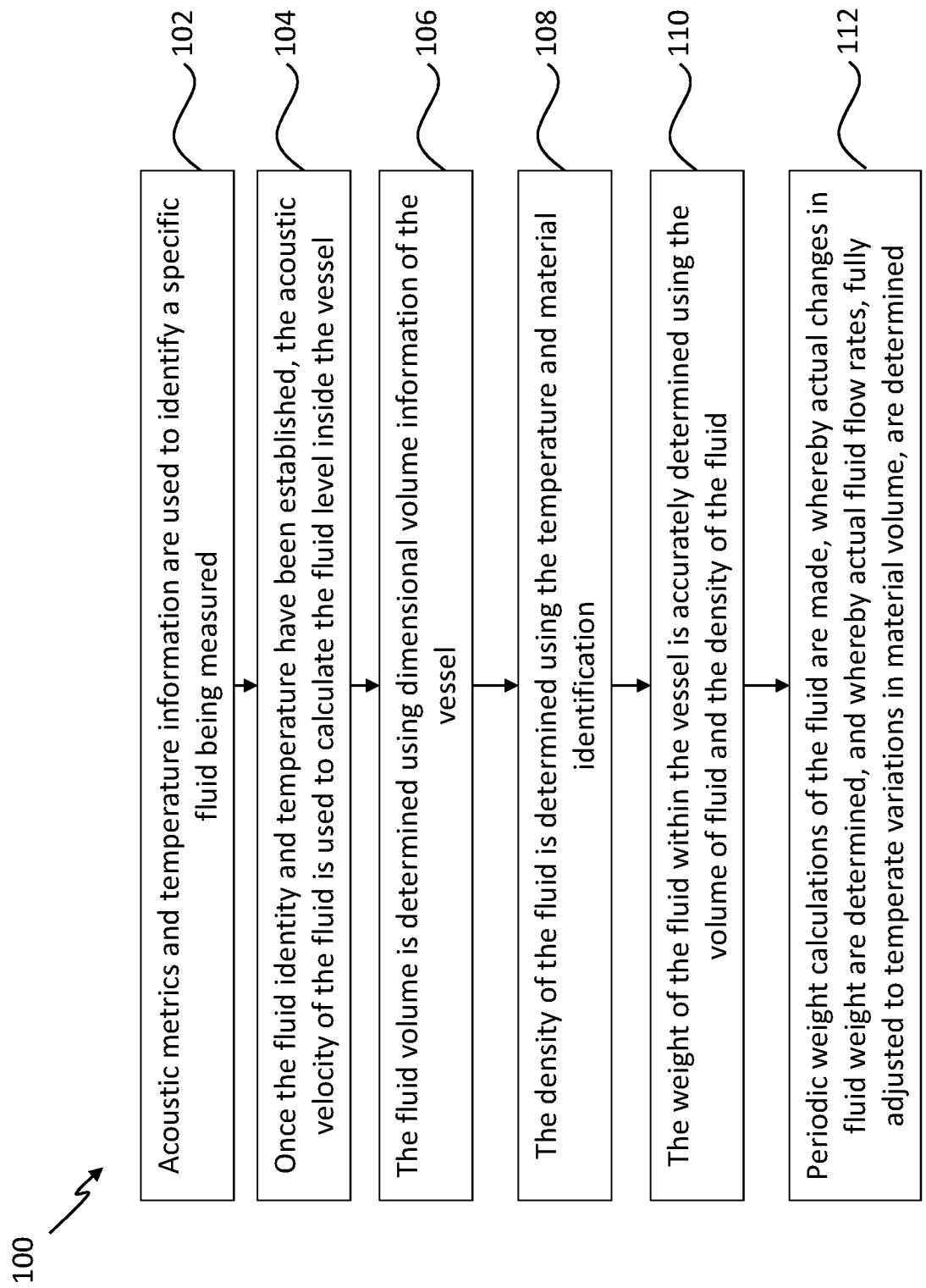
FIG. 5A is a flowchart illustrating a method of metering fluid in a tank, in accordance with the first exemplary embodiment of the present disclosure.

FIG. 5A is a flowchart 100 illustrating a method of metering a fluid in a tank, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown by block 102, acoustic metrics and temperature information are used to identify a specific fluid being measured. Once the fluid identity and temperature have been established, the acoustic velocity of the fluid is used to calculate the fluid level inside the vessel (block 104). The fluid volume is determined using dimensional volume information of the vessel (block 106). The density of the fluid is determined using the temperature and material identification (block 108). The weight of the fluid within the vessel is accurately determined using the volume of fluid and the density of the fluid (block 110). Periodic weight calculations of the fluid are made, whereby actual changes in fluid weight are determined, and whereby actual fluid flow rates, fully adjusted to temperate variations in material volume, are determined (block 112).

Figure 5B:
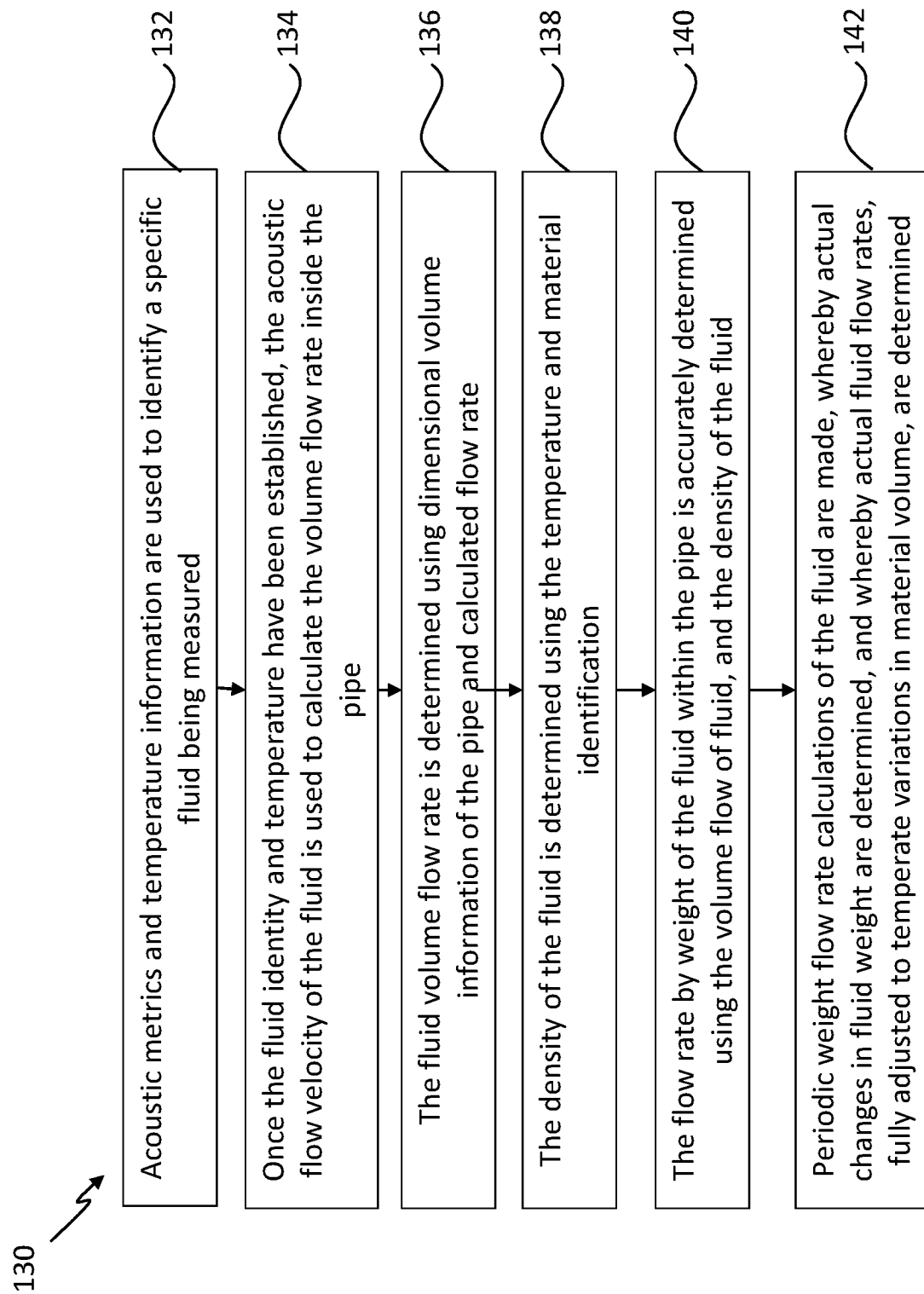
FIG. 5B is a flowchart illustrating a method of metering fluid in a pipe, in accordance with the first exemplary embodiment of the present disclosure.

FIG. 5B is a flowchart 130 illustrating a method of metering a fluid in a pipe, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown by block 132, acoustic metrics and temperature information are used to identify a specific fluid being measured. Once the fluid identity and temperature have been established, the acoustic flow velocity of the fluid is used to calculate the volume flow rate inside the pipe (block 134). The fluid volume flow rate is determined using dimensional volume information of the pipe and calculated flow rate (block 136). The density of the fluid is determined using the temperature and material identification (block 138). The flow rate by weight of the fluid within the pipe is accurately determined using the volume flow of fluid, and the density of the fluid (block 140). Periodic weight flow rate calculations of the fluid are made, whereby actual changes in fluid weight are determined, and whereby actual fluid flow rates, fully adjusted to temperate variations in material volume, are determined (block 142).

Figure 6:
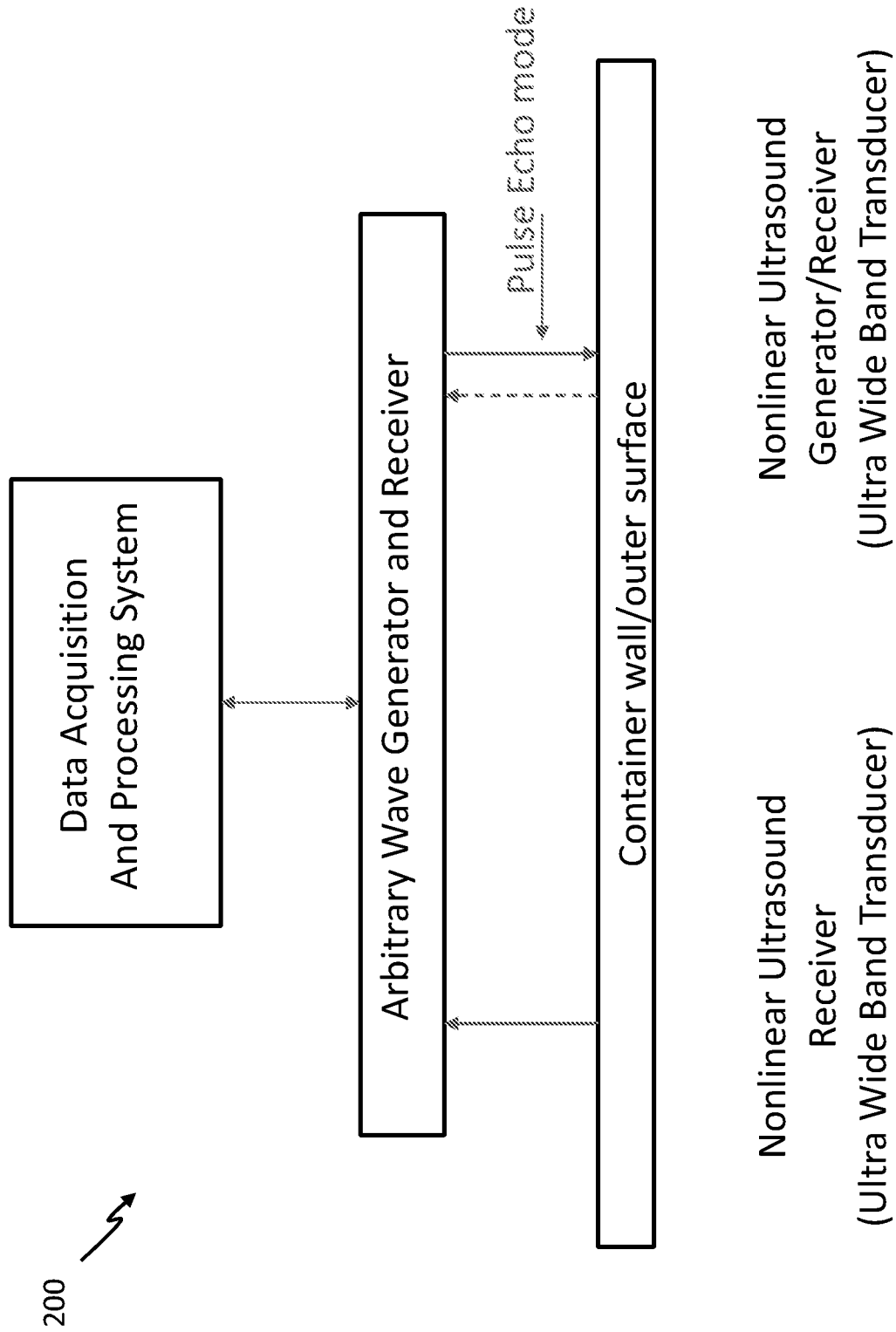
FIG. 6 is an illustration of a method of detecting structural characteristics of a vessel of FIG. 1, in accordance with a third exemplary embodiment of the present disclosure.

While FIGS. 1-5B primarily discuss the detection of the material weight and to determine a flow rate of the material, similar techniques can be used to detect structural characteristics of a container or vessel containing the fluid. FIG. 6 is an illustration 200 of a method of detecting structural characteristics of a vessel of FIG. 1, in accordance with a third exemplary embodiment of the present disclosure. FIG. 6 is an illustration 300 of comprehensive signal processing techniques used with the method of detecting structural characteristics of the vessel 12 of FIG. 1, in accordance with the third exemplary embodiment of the present disclosure.

Non-linear ultra-wide band acoustic/ultrasound signal is excited using linear/forward/reverse/exponential chirp. Apart from measuring absolute time-of-flight, differential time-of-flight is also recorded. Since sound waves are dispersive in nature, dispersion characteristics are used to determine temperature effects and localized structural health monitoring which mainly includes detection of corrosion, delamination, and cracks. To achieve high accuracy and reliability, received signal (either from same transducer in pulse-echo mode or from the second transducer in pitch-catch mode) is processed in data acquisition and processing system. Comprehensive signal processing, using multiple signal processing tools, can be used. Some of the key extracted features are absolute time-of-flight, differential time-of-flight, phase, magnitude, and frequency.

Figure 7:
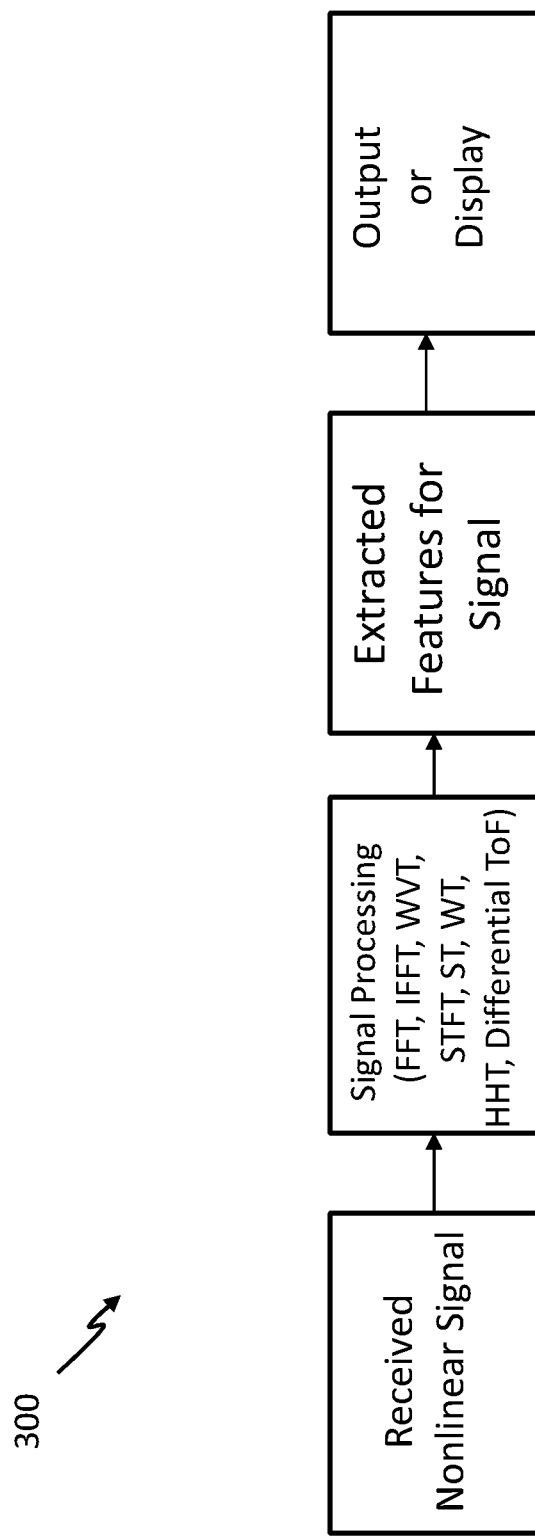
FIG. 7 is an illustration of comprehensive signal processing techniques used with the method of detecting structural characteristics of the vessel of FIG. 1, in accordance with the third exemplary embodiment of the present disclosure.

With reference to FIGS. 1, 6, and 7, together, the method and system disclosed in FIG. 6 may be used with the structural features disclosed in FIG. 1 to detect structural characteristics of a vessel 12. For example, the vessel 12, or other structural container capable of holding the fluid, may be constructed from parts which are conducting and non-conducting. The processing techniques utilize non-linear ultra-wide band acoustic/ultrasound signal which is excited using linear/forward/reverse/exponential chirp. Apart from measuring absolute time-of-flight, differential time-of-flight is also recorded. Since sound waves are dispersive in nature, dispersion characteristics are used to determine temperature effects and localized structural health monitoring of the vessel 12 itself. This may include the detection of corrosion, delamination, and cracks, among other structural characteristics which are desired to be monitored or detected. To achieve high accuracy and reliability, the received signal (either from same transducer in pulse-echo mode or from the second transducer in pitch-catch mode) is processed in data acquisition and processing system. FIG. 6 provides further details on the possible signal processing techniques, including more comprehensive signal processing using multiple signal processing tools. Some of the key extracted features are absolute time-of-flight, differential time-of-flight, phase, magnitude, and frequency.

As a working example, the use of ultrasonic guided waves for damage detection in pipes has been studied. Generally longitudinal (axial symmetric) modes are excited and detected by PZT (Lead Zirconate Titanate) transducers in transmission mode for this purpose. In most studies the change in the received signal strength with the extent of damage has been investigated while in this study the change in the phase, the time-of-flight (TOF) and differential time-of-flight of the propagating wave modes with the damage size is investigated. The cross-correlation technique is used to record the small changes in the TOF as the damage size varies in steel pipes. Dispersion curves are calculated to carefully identify the propagating wave modes. Differential TOF is recorded and compared for different propagating wave modes. Feature extraction techniques are used for extracting phase and time-frequency information. The main advantage of this approach is that unlike the recorded signal strength the TOF and the phase are extracted which are not affected by the bonding condition between the transducer and the pipe. Therefore, if the pipe is not damaged but the transducer-pipe bonding is deteriorated then although the received signal strength is altered the TOF and phase remain same avoiding the false positive alarms of damage. The goal is not only to detect the damage but also to quantify it, or in other words to estimate the damage size. The transient signals for pristine and damaged pipes were processed using the Fast Fourier Transform (FFT), Wigner-Ville Distribution Transform (WVDT), S-Transform (ST) and Hilbert Huang Transform (HHT). It is demonstrated that the time-of-flight is sensitive to the size of the damage on the pipe wall. The instantaneous phase extracted by HHT can also be used for detecting the damage. For estimating the damage size the phase shift associated with the $L(0,1)$ mode should be monitored after separating the $L(0,1)$ mode from the $L(0,2)$ mode by considering appropriate intrinsic mode function contributions. FFT, S-Transform and WVD Transform did not show any significant and consistent shift in the frequency and amplitude of the propagating waves for 1.6 mm diameter damage. However, noticeable change in the magnitude of the propagating wave was observed for 3.25 mm and 6.35 mm hole type damage. During in-situ pipe inspection the received signal amplitude drop can be also a result of the deterioration of the bonding between the sensors and the pipe. Therefore, instead of the received signal strength monitoring, it is recommended that the changes in TOF and the signal phase shift should be measured for pipe wall damage detection and monitoring, since these parameters are not affected by the bonding condition between the transducers and the pipe. The results show that it is possible to detect and quantify hole type defects in a pipe by monitoring the TOF variation and phase shifts of the appropriate guided wave modes.

In another example, the change in TOF due to corrosion in reinforcing steel bars was measured. The transient signals for non-corroded and corroded samples are processed using FFT, STFT, CWT, and ST. The TOF information is obtained from the ST and the cross-correlation technique. It was demonstrated that the TOF of the L(0,1) mode shows high sensitivity to the corrosion level in steel bars. FFT, STFT, CWT, and ST show significant changes in the amplitude of the propagating waves. Due to dispersive nature of propagating waves, it is better to use ST instead of FFT, STFT, and CWT for signal analysis. At higher frequencies, ST gives reliable results in the time domain, but some information related to the frequency is lost. Reduction in the amplitude of the recorded signal can be caused by corrosion as well as the deterioration of the mechanical bonding between the sensors and the specimens but such deterioration of bonding does not affect TOF. Therefore, TOF measurement is more reliable for quantitative measurement of corrosion level. L(0,1) mode is found to be very reliable for corrosion detection and monitoring its progress. The corrosion induced TOF variation obtained from the ST and cross-correlation matched well with each other and also closely matched with the theoretical dispersion curves. Calculated dispersion curves helped to identify the propagating guided wave mode used to monitor the corrosion level in reinforcing steel bars.

In a related embodiment, non-linear ultrasound testing (characterization/evaluation) can also be used for measuring the strength of material. Materials can be isotropic and anisotropic (metals and non-metals). For example, additive materials within the manufacturing industry, such as the 3D printing industry, can use a combination of virgin powder and used powder which is left over from earlier build. It is known that material properties such as Modulus of Elasticity and density change due to changes in temperature, pressure and other factors. Therefore, structural integrity independent of geometry is directly related to how many times recycled powder can be reused. Similarly, strength of composite materials and concrete (included but not limited to conventional concrete, geopolymer concrete etc.) is also directly related to composition. In case of concrete, aggregate size, curing time, quality of cement, etc. can affect the strength. Accordingly, the strength and reliability of concrete during different stages of curing is successfully detected using non-linear ultrasound testing technique.

In a related embodiment of the subject disclosure, acoustic sensors can be used for determining a fill level on a fluid vessel or any type of fluid tank, whereby an alarm is activated or sounded if the fluid level moves beyond a predetermined level. As discussed in the Background section, conventional tank fill level sensors are available to determine a fill level by measuring from the top down to the liquid surface, or through the use of embedded radar devices, sensor wires and tubes which are mounted inside the tank. However, these fill level sensors are not highly accurate due to the presence of vapors which can distort the distance measurements to the actual fluid level. Additionally, these conventional fill level sensors must be installed inside tanks or containers which often have internal floating roofs and other obstructions that make the conventional fill level sensors problematic to operate, service and maintain.

In accordance with a fourth exemplary embodiment of the present disclosure, a tank fill level sensor with alarm can be used to determine the various criteria pertaining to a tank, including presence of fluid within the tank, the presence of a structural material, or the lack of liquid or structural materials, i.e., where an air gap exists, at specific levels within a fluid vessel. The fluid vessel may commonly be one that contains oil, gas, another petroleum product, but the fluid vessel may hold or contain any other type of fluid. It is noted that the identity of the fluid type need not be determined or known.

Figure 8:
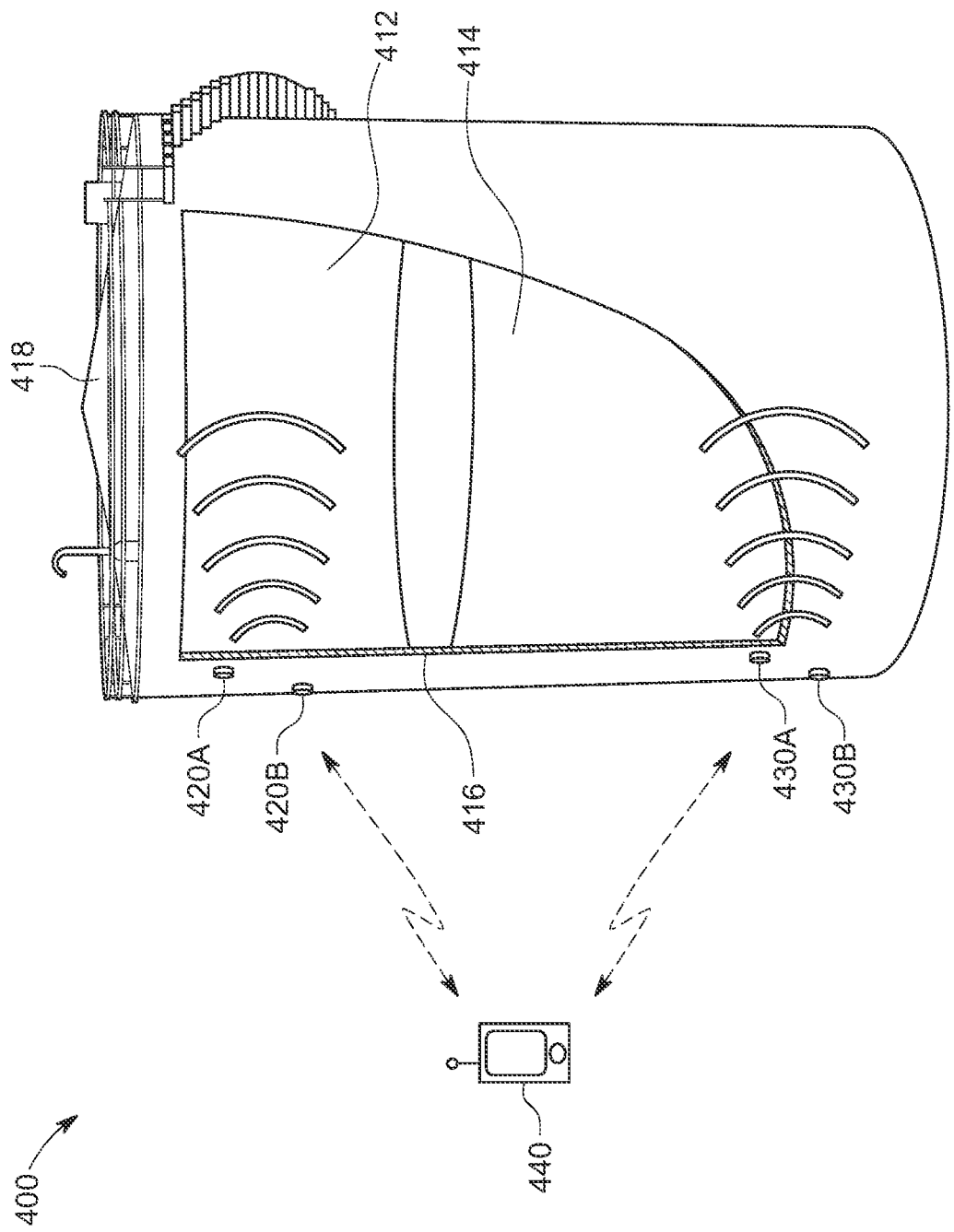
FIG. 8 is a diagrammatical illustration of a system for determining a fill level of a quantity of fluid within a fluid vessel, in accordance with a fourth exemplary embodiment of the present disclosure.

FIG. 8 is a diagrammatical illustration of a system 400 for determining a fill level of a quantity of fluid within a fluid vessel, in accordance with a fourth exemplary embodiment of the present disclosure. As shown, a fluid vessel 412 contains a quantity of fluid 414 within an interior compartment thereof. The fluid vessel 412 or tank has a bottom structure, one or more sidewalls 416, and a roof 418. At least one acoustic sensor 420A is positionable along a sidewall 416 of the vessel 412, wherein the at least one acoustic sensor 420A senses a fill level of the quantity of fluid 414 in the vessel 412. While the system 400 may be operable with only one acoustic sensor 420A, it may be possible to use multiple sensors. For example, in FIG. 8, the two acoustic sensors 420A and 420B are positioned near an upper part of the vessel 412 to sense a possible overflow of the vessel 412. The acoustic sensors are positioned on the outside of the vessel 412, such that they do not need to come into contact with the fluid 414 inside, nor do they need to be positioned fully or partially within the internal compartment of the vessel 412. One or more additional acoustic sensors 430A, 430B may also be included at other locations of the vessel 412, such as towards a floor of the vessel 412, as shown in FIG. 8, to sense a low quantity of fluid 414 therein. Positioning additional acoustic sensors 430A, 430B at any other location or locations on the vessel 412 is also possible. The system 400 may include any of the features disclosed relative to any other figure or embodiment of this disclosure.

One benefit of the present system 400 is that by using two or more acoustic sensors 420A, 420B, 430A, 430B, or similar transducers, located relatively close to each other, e.g., approximately a few inches apart, on the exterior of the vessel 412, it is possible to detect the presence of fluid 414 and other fluid properties, such as acoustic velocity and fluid density, an attenuation of the fluid, a fluid viscosity, a resonance of the fluid, and/or an absorption spectra of the fluid within the vessel 412 at that location. This detection of the fluid properties can be achieved irrespective of the design of the vessel 412, including internal obstructions, such as pipes, structural bracing, seals or membranes, floats, a roof structure, or other structures. Accordingly, acoustic sensors 420A, 420B positioned near the top of the vessel 412 can detect when the fluid level is nearing the top and thus prone to overfilling, while sensors at or near the bottom 430A, 430B of the vessel 412 can detect when the fluid level is getting too low. The location of the acoustic sensors may be selected by a vessel 412 operator or another individual, and any location along the vessel 412 may be chosen.

In one example specific to the petroleum industry, it may be desired to install the sensors at four different preset levels on the tank. These positions of the sensor are shown in FIG. 8, and include: 1) High Level of sensor 420A; 2) High-High Level at sensor 420B; 3) Low Level at sensor 430A; and 4)

Low-Low Level at sensor 430B. This positioning of the sensors may allow for dual detection, i.e., an initial warning and a secondary warning, for a fluid level near the top of the vessel 412 and/or the bottom of the vessel 412, respectively. Similar arrangements can be used for detecting structural components, such as a floating roof, or an air gap, or other situations where there is a lack of fluids or structural components in the vessel 412. For any sensor location, the system 400 can provide an overfill or an underfill alarm application which uses the two or more sensors 420A, 420B, 430A, 430B located at a specific level on the vessel 412 to determine the presence of a fluid, a structural material or air gap at that point. When either a fill level is detected or not detected at the desired location of the sensors 420A, 420B, 430A, 430B, the system 400 can communicate the detection using a wired or wireless alarm or communication system 440 such that appropriate personnel can be notified. This may include various types of alarms and alerting features, such as electronic communications, audible sirens, lights, etc., or it may be used to trigger electro-mechanical devices. For example, a detected overfill alarm can be used to shut off a fluid pump which is delivering fluid into the vessel 412.

It is noted that in addition for the system 400 to provide warnings to operators to potential overfill conditions, it can also provide alarms as to fluid levels that are too low. The reason for concern about fluid levels being too low are related generally to floating roofs of the vessels being potentially damaged and/or to detect the presence of air space under the floating roof that can present a potentially hazardous situation in terms of fire (presence of air next to flammable fluids). It can also be useful to identify or prevent environmental air quality issues or emissions situations. When the level of the fluid 414 has been sensed to fall below a position proximate to the bottom of the vessel 412, a signal may be communicated to the wired or wireless alarm or communication system 440 to notify of the situation.

The system 400 disclosed herein is an improvement over the conventional detection systems for a number of reasons. One such reason is that the system 400 uses sensors 420A, 420B, etc., which can be mounted on the outside or external surface of the vessel 412, whereas conventional fluid level sensors are generally mounted inside the tank, such as on an interior sidewall of the tank, on an interior surface of a top cover, or located in another position within the tank itself. Additionally, system 400 can measure additional fluid parameters from the external surface of the vessel. These conventional sensors may include radar devices mounted on the interior roof of the tank, wire sensors running from the top of the tank to the bottom that detects small electrical conduction when liquid is present, as well as mechanical floats, among others. These conventional units are expensive to install and are often not functional depending on the design of the tank. For example, tanks that have internal floating roofs will provide challenges for many of these interior sensors. Additional problems with these conventional systems are related to failure due to environmental material degradation of the internal sensors, such as corrosion of the interior sensors, due to the constant presence of corrosive liquids and gases inside the tanks.

Another improvement of the subject disclosure over conventional systems is the system 400 does not require a clear acoustic path across the interior of the vessel 412, unlike conventional systems which typically do require a clear acoustic path. In the system 400, the sensors 420A, 420B, 430A, 430B are mounted on the exterior of the vessel 412 and are not affected by the presence of objects internal of the sidewall of the vessel 412, including pipes, cabling, and/or structural support structures. Indeed, any obstructions in the path will not disrupt the acoustic signal of the system 400. Since most petroleum tanks are designed with floating roofs for safety purposes, and thus have structural and mechanical components in the acoustic path, a vessel 412 with a clear acoustic path is difficult to achieve. Thus, the system 400 can greatly improve fluid level detection over conventional systems by being able to detect the fluid level irrespective of structural or mechanical components in the acoustic path. In some cases, the system 400 can be used to detect the presence of floating roof structures as they pass by the sensors. The system 400 may also be able to detect other structures within the tank including secondary floating roof seal devices.

It is further noted that the use of a plurality of sensors to determine the fill level of the fluid 414 within the vessel 412 may be enhanced with the use of data analysis software, such as machine learning. For example, when a fluid level is higher than the most vertical sensor 420 on a vessel, it may still be possible to determine the fluid fill level based on acoustic data collected from a series of sensors mounted vertically on the vessel. These sensors may emit a variety of acoustic signals which are processed within the computing device 440 using a machine learning application. The machine learning application may be able to accurately determine the fill level of the fluid 414 in the vessel 412.

Figure 9:
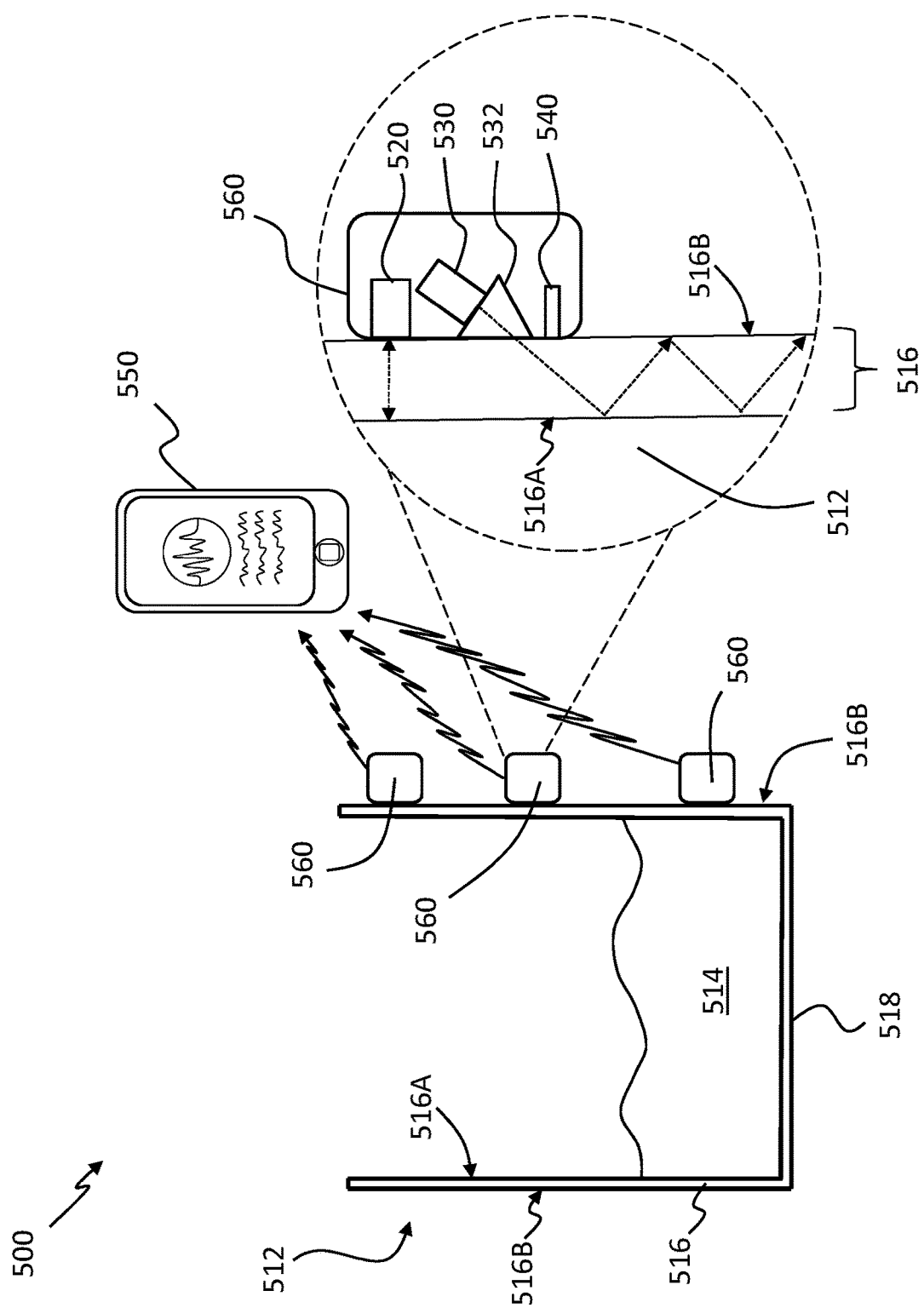
FIG. 9 is a diagrammatical illustration of a system for analyzing the properties of a vessel and/or a material within the vessel, in accordance with a fifth exemplary embodiment of the present disclosure.

In a related embodiment of the subject disclosure, acoustic sensors can be used to calculate the actual fluid levels between sensor units effectively acting as a variable fill level sensor and can be used for detecting structural characteristics of a container or vessel designed to contain fluid. As discussed in the Background section, there is a shortage of real-time tank wall testing units available to determine wall thickness, the condition of the wall material, any deterioration of the wall material, and to detect the presence of any build-up of material to the inside of the wall. To overcome these shortcomings, FIG. 9 is a diagrammatical illustration of a system 500 for analyzing the properties of a vessel and/or a material within the vessel, in accordance with a fifth exemplary embodiment of the present disclosure. As shown in FIG. 9, the vessel 512 has sidewalls 516 and a bottom wall 518 which together contain a quantity of fluid 514. The sidewalls 516 include an interior surface 516A positioned interfacing the fluid 514 and an exterior surface 516B which is positioned interfacing an exterior atmosphere. At least two sensors units 560 are positioned on the exterior surface 516B of the vessel 512, which are in wired or wireless communication with a computerized device 550. Each sensor unit 560 includes at least two transducers 520, 530, and a temperature sensor 540 and the operation of the two transducers 520, 530 relative to the sidewall 516 of the vessel 512 and the fluid 514 is shown in the enlarged view of FIG. 9.

As shown in the enlarged view of FIG. 9, one of the transducers 520 produces a longitudinal acoustic wave into sidewall 516. The reflection of this acoustic wave is used to determine if fluid is present within the vessel 512 at the vertical height of the transducer 520 and to determine the sidewall 516 thickness. The second transducer 530 is mounted at an angle relative to the sidewall 516 of the vessel 512. For example, the second transducer 530 may be mounted on an angle block 532 or similar structure, which mounts to the exterior surface 516B of the sidewall 516 and provides an angular platform or surface for mounting the second transducer 530, such that the relative orientation of the second transducer 530 to the sidewall 516 is angular, i.e., a non-perpendicular position of the acoustic wave direction of the second transducer 530 relative to the height of the sidewall 516. The angular position of the second transducer 530 can vary, as needed. In one example, the angular position may be substantially 45°.

In operation, the second transducer 530 transmits a longitudinal acoustic wave, or shear wave, within the sidewall 516. This longitudinal wave travels along the sidewall 516, i.e., down the sidewall 516 when the transducer 530 is angled downwards or up the sidewall 516 when the transducer 530 is angled upwards, and reflects off of the inner sidewall surface 516A and the outer sidewall surface 516B. If there is air in the vessel 512 proximate to the location of the second transducer 530, then there may be limited transmittance of the signal through the inner sidewall 516A. At the fluid 514 level, there will be an identical percentage of transmittance (e.g. less amplitude in the reflected wave) for each 'bounce' of the wave in the sidewall 516. This attenuated signal is then measurable at transducer 520 within the next lower sensor unit 560 (or upper sensor unit 560, if the second transducer 530 is angled upwards). As part of this process, the sidewall 516 temperature is measured with the temperature sensor 540, the sidewall 516 thickness is calculated, and the distance between the sensor units 560 are measured.

With this data, it is then possible to calculate the coefficient for reflectance of the plane wave using the following formula:

$$R = \frac{c_1 \rho_1 \cos\theta - c\rho\cos\theta_1}{c_1 \rho_1 \cos\theta + c\rho\cos\theta_1}$$

where c and $c_1$ are the speed of sound in the two adjacent materials, i.e., the material forming the sidewall 516 and the fluid 514 within the vessel 512 (or another substance in the vessel 512, such as air, a structural component, sediment on the interior surface 516A of the sidewall 516, etc.), where $\rho$ and $\rho_1$ are the densities of the two adjacent materials, and where $\theta$ and $\theta_1$ are the angles that the sound wave approaches the interface where the two materials meet. This calculation can be performed in the computing device 550, which receives the signals and readings from the sensor units 560. The computing device 550 also calculates the actual fluid levels between the sensor units 560. In this way, the system 500 can effectively act as a variable fill level sensor, such that the actual fluid level within the vessel 512 can be determined when it is at any height within vessel 512. Using the measured density, velocity and temperature of the fluid 514, as previously described, the computing device 550 can identify the material type of the fluid 514 by comparing these metrics to those of other fluids and liquids in an acoustic database of materials.

Beyond determining the material type of fluid 514 within the vessel 512, the system 500 may also be used for other functions which are relevant to the vessel 512. For example, each sensor unit 560 positioned along the sidewall 516 of the vessel 512 may operate as a point fill level sensor, which in turn, can be used to send notifications or alarms for certain sensed fluid 514 conditions, such as the fluid 514 being too high within the vessel 512, or too low within the vessel 512. The system 500, or any other system which uses multiple point level sensors, may also be used in a complimentary or validation capacity with other fluid sensors. For example, the system 500 may be used to provide fill level validation of measurements taken with other devices, such as conventional internal radar units, and/or exterior units which monitor the flow of fluid through outlets and inlets of the vessel (such as described relative to FIG. 4A).

With either system 400 described relative to FIG. 8 or system 500 described relative to FIG. 9, it is noted that in addition to detecting the presence of fluid within the vessel, it is also possible to detect the presence of other materials. For example, the sensors may be capable of detecting sediment which is scaled on the sidewall or bottom of the vessel, or the presence of undesired substances which have mixed with the fluid. As a specific example, it may be possible to detect the presence of water within a vessel which holds petroleum products. The ability to detect the presence of other materials, beyond the originally-intended fluid, may be achieved through the same process as previously described, where the sensed properties of these other materials are compared to a material database to provide a correlated identity of the material.

When readings with the sensors are taken over a period of time, it may also be possible to determine levels of fluid fill level accurately, since the periodic measurements can be used to determine an accurate estimate of a rate of change in the fill level of the fluid which can effectively act as a fluid flow metering device. Moreover, readings taken over a period of time may also be used to sense a material degradation of the fluid. For example, taking readings of the fluid within the vessel periodically, such as every day or week, may allow for the system to analyze a comparison of the acoustic metric readings on the fluid, which can be used to determine the relative change of those properties over time. This can be used to determine if there is a material degradation of the fluid, which may occur due to various conditions, such as when a fluid is stored too long, or when fluid with unsatisfactory properties, i.e., a bad off-spec batch, is added to a vessel with high quality fluid.

Additionally, the system 500 may be used for detecting or sensing changes or degradation of the sidewall 516 of the vessel 512. For example, the signals from the first and second transducers 520, 530 may be recorded when the level of the fluid in the tank at the specific time of testing is below both the units 560 that are transmitting and receiving the attenuated signal. The system 500 may be used for detecting or sensing changes or degradation of the sidewall 516 of the vessel 512 when the level of the fluid in the tank at the specific time of testing is above or below both the units 560 that are transmitting and receiving the attenuated signal. For example, with the top two sensing units 560 in FIG. 9, the system 500 can detect changes in the sidewall 516 when the fluid 514 level is positioned above both of these sensing units 560 or positioned below both of these sensing units 560, whereas it may not be possible to sense the condition of the sidewall 516 when the fluid 514 level is between these two sensing units 560. Over time, analysis of the data collected as to wall thickness and various acoustic signatures ("acoustic fingerprints"), as qualified by tank fill levels, will allow the system 500 to detect noticeable changes in wall thickness, wall condition, the presence of any foreign material on the inside surface 516A of the sidewall 516 of the vessel 512 as detected by the acoustic fingerprints collected periodically. This may also allow for the detection of anomalies between acoustic fingerprints from earlier recorded data. The results over time are able to provide an accurate method for tracking vessel sidewall 516 deterioration, the presence of material build-up, and wall thickness for the vessel 512, all while the tank remains in service operationally, without needing to drain the tank or otherwise change the tank from its normal operating state.

With reference to FIG. 9, the method and system disclosed in FIG. 9 may be used with the structural features disclosed in FIGS. 1 and 8 to detect structural characteristics of a vessel 512. For example, as shown in FIG. 9, the vessel 512, or other structural container capable of containing the fluid, may be constructed from materials which are conducting and non-conducting. A first acoustic sensor unit 560 (including one or more transducers and one temperature probe) may be positionable along a sidewall of the vessel 512. When each of the units 560 are installed, they will measure the wall thickness with high accuracy. Every time one of the units 560 collect measurements, transducer 520 will remeasure the wall thickness and pass the information to the processor of the computerized device 550. The processor of the computerized device 550 will compare the thickness measurements over time to determine any variation in the long term.

Through the use and comparison of periodic measurements and analytics on acoustic metrics between sensors placed at specific distances apart over a long period of time, i.e. year to year, the identification of anomalies or changes in wall material can be detected. Any such anomaly or change detection would alert the operational resources to take additional action.

During the normal operation of these sensor units 560, the system 500 can determine the presence of material on the inner wall surface 516A. For example, identification of material build-up on interior surface of the vessel 512 sidewall 516 would be determined when transducer 530 inside the sensing unit 560 sends an ultrasonic signal into sidewall 516, the signal will attenuate a very limited amount when there is air on either side of the sidewall 516. If there is solid material build-up on the interior surface 516A of sidewall 516, then the signal from transducer 530 will attenuate much more than in air and a different amount than for a fluid 514 in the tank 512. The attenuation difference can be characterized using the identification data from transducer 520. If there is material build-up opposite transducer 520, then there will be a secondary reflection indicating the presence of the build-up and several of its material properties.

Figure 10:
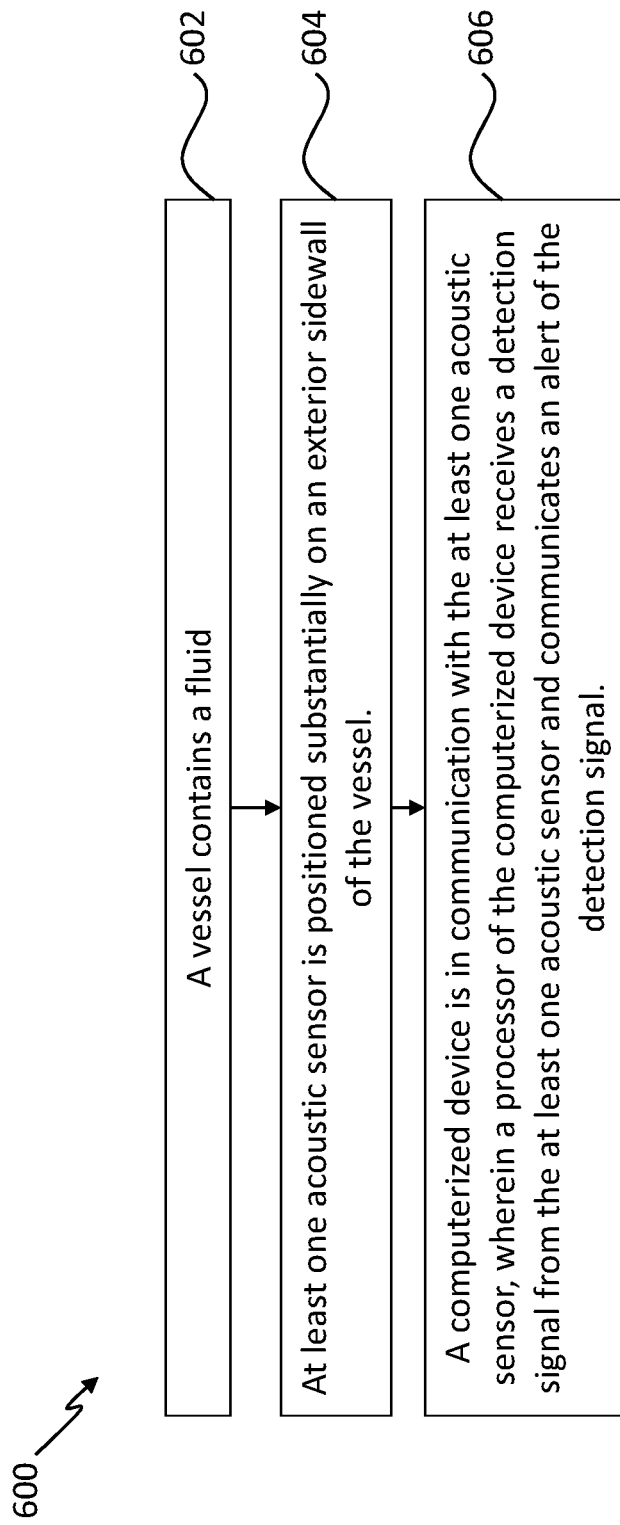
FIG. 10 is a flowchart illustrating a method for determining a fill level of a fluid within a fluid vessel, in accordance with the fourth exemplary embodiment of the disclosure.

FIG. 10 is a flowchart 600 illustrating a method for determining a fill level of a fluid within a fluid vessel, in accordance with the fourth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 602, a vessel contains a fluid. At least one acoustic sensor is positioned substantially on an exterior sidewall of the vessel (block 604). A computerized device is in communication with the at least one acoustic sensor, wherein a processor of the computerized device receives a detection signal from the at least one acoustic sensor and communicates an alert of the detection signal (block 606). The detection signal may include a fluid detection signal at one or more designated levels along a height of the vessel, a detection signal of a structural material at one or more designated levels along the height of the vessel, and/or a detection signal of an air gap at one or more designated levels along the height of the vessel, among other types of detection signals. The detection signal may be used to determine an actual fill level of the fluid within the vessel, and/or to activate an overfill alarm corresponding to the vessel, an emissions alarm corresponding to the vessel, and/or an air-gap alarm corresponding to the vessel, among other processes. Any number of additional steps, functions, processes, or variants thereof may be included in the method, including any disclosed relative to any other figure of this disclosure.

Figure 11:
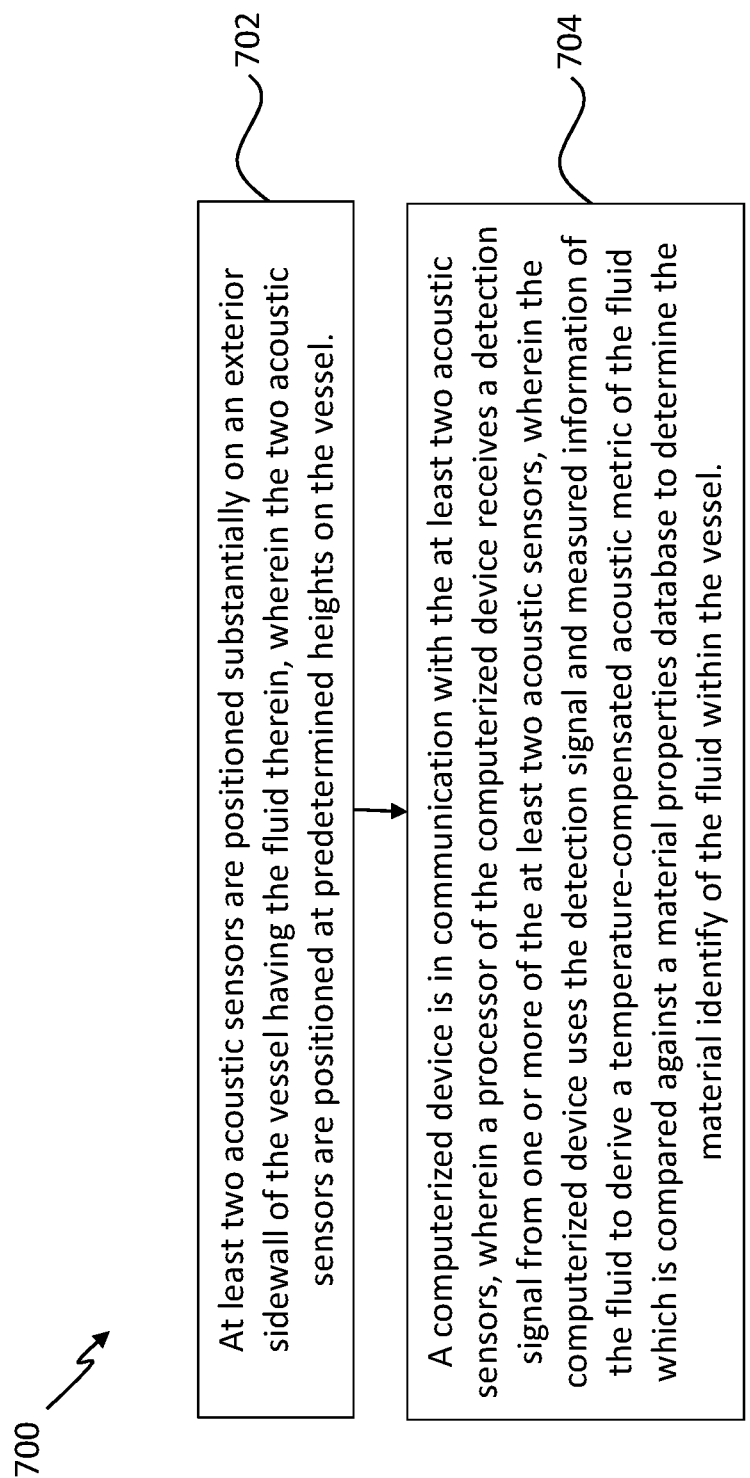
FIG. 11 is a flowchart illustrating a method for determining a material identity of a fluid being stored in a vessel, in accordance with the fourth exemplary embodiment of the disclosure.

FIG. 11 is a flowchart 700 illustrating a method for determining a material identity of a fluid being stored in a vessel, in accordance with the fourth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 702, at least two acoustic sensors are positioned substantially on an exterior sidewall of the vessel having the fluid therein, wherein the two acoustic sensors are positioned at predetermined heights on the vessel. A computerized device is in communication with the at least two acoustic sensors, wherein a processor of the computerized device receives a detection signal from one or more of the at least two acoustic sensors, wherein the computerized device uses the detection signal and measured information of the fluid to derive a temperature-compensated acoustic metric of the fluid which is compared against a material properties database to determine the material identify of the fluid within the vessel (block 704). The measured information of the fluid may be at least one of: a sensed temperature of the fluid; a fluid velocity; or a fluid density. Additionally, a plurality of detection signals may be received by the computerized device over a period of time, wherein at least a portion of the plurality of detection signals are used to determine a change in material property of the fluid. The change in material property of the fluid comprises at least one of: a deterioration of the fluid; a degradation of the fluid, or a contamination of the fluid. Moreover, the detection signal is used to determine the presence of material different from the fluid, such as: a quantity of air; a structural component of the vessel; a membrane of the vessel; a quantity of water; and/or a quantity of sediment on a bottom or sidewall of the vessel. Any number of additional steps, functions, processes, or variants thereof may be included in the method, including any disclosed relative to any other figure of this disclosure.

Figure 12:
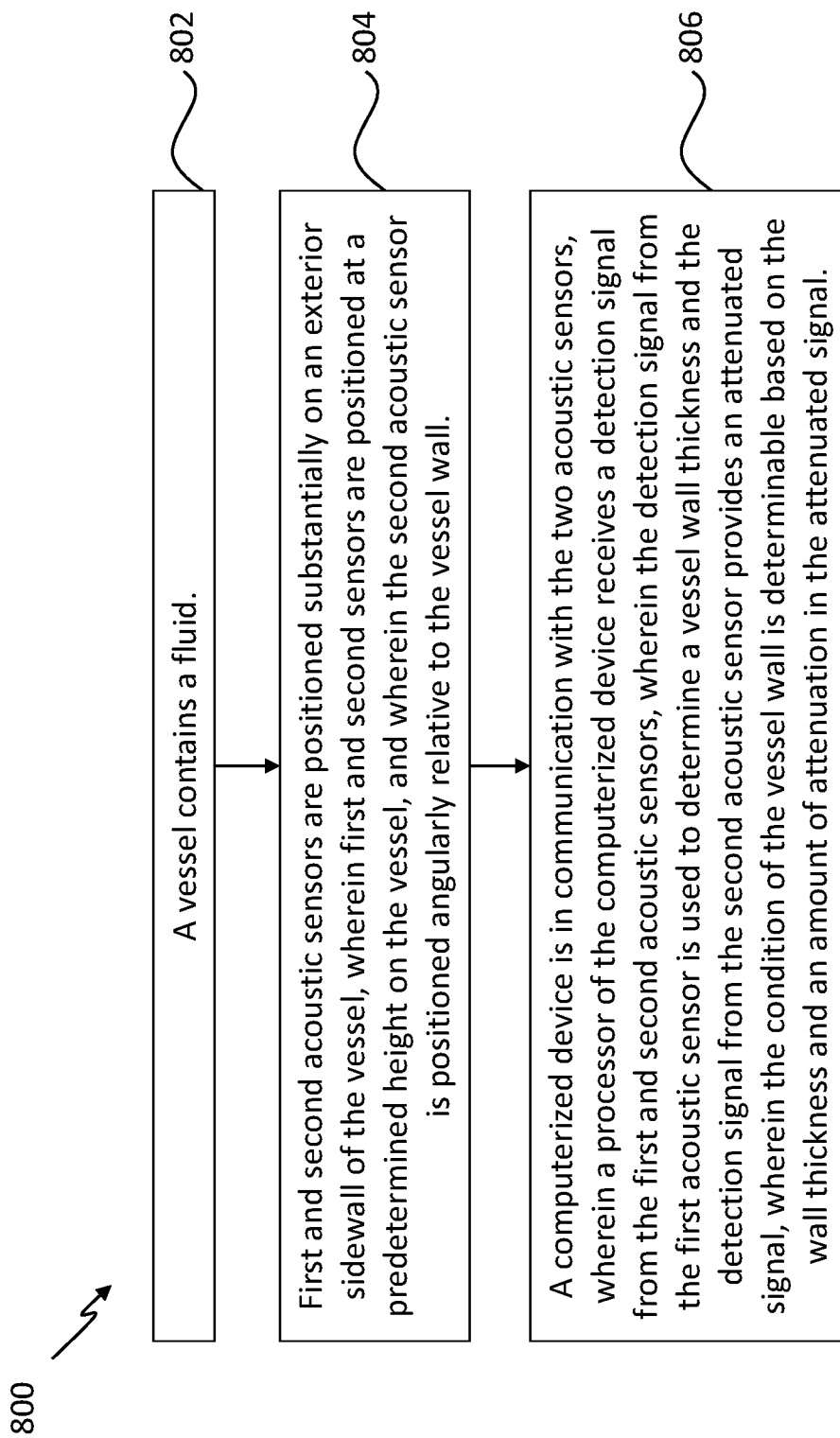
FIG. 12 is a flowchart illustrating a method for determining a condition of a vessel wall, in accordance with the fifth exemplary embodiment of the disclosure.

FIG. 12 is a flowchart 800 illustrating a method for determining a condition of a vessel wall, in accordance with the fifth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 802, a vessel contains a fluid. First and second acoustic sensors are positioned substantially on an exterior sidewall of the vessel, wherein first and second sensors are positioned at a predetermined height on the vessel, and wherein the second acoustic sensor is positioned angularly relative to the vessel wall (block 804). A computerized device is in communication with the two acoustic sensors, wherein a processor of the computerized device receives a detection signal from the first and second acoustic sensors, wherein the detection signal from the first acoustic sensor is used to determine a vessel wall thickness and the detection signal from the second acoustic sensor provides an attenuated signal, wherein the condition of the vessel wall is determinable based on the wall thickness and an amount of attenuation in the attenuated signal (block 806). It is noted that the condition of the vessel wall may include one or more of: a detected change in vessel wall thickness; an identification of material build-up on the vessel wall; and/or a structural deterioration condition of the vessel wall. Additionally, a plurality of first and second signals may be received by the computerized device over a period of time, whereby a change of the condition of the vessel wall can be determined over that period of time. Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for determining a fill level of a fluid within a fluid vessel comprising:
   a vessel containing the fluid;
   at least two acoustic sensors positioned substantially on an exterior sidewall of the vessel, the at least two acoustic sensors positioned at different heights on the exterior sidewall, wherein each of the at least two acoustic sensors transmits a longitudinal signal through the exterior sidewall of the vessel, at a location on the vessel where the at least two acoustic sensors are positioned, and to an interface between an inner surface of the exterior sidewall of the vessel and the fluid contained within the vessel, wherein the transmitted signal generates a detection signal reflected from the interface between the inner surface of the exterior sidewall and the fluid contained within the vessel, the detection signal based on at least one fluid property of the fluid at the interface between the inner surface of the exterior sidewall and the fluid contained within the vessel, wherein the detection signal is received at the acoustic sensor from which the transmitted signal was transmitted; and
   a computerized device in communication with the at least two acoustic sensors, wherein a processor of the computerized device receives the detection signal from at least one of the at least two acoustic sensors and communicates an alert of the detection signal.

2. The system of claim 1, wherein the detection signal comprises at least one of: a fluid detection signal at one or more designated levels along a height of the vessel; a detection signal of a structural material at one or more designated levels along the height of the vessel; and a detection signal of an air gap at one or more designated levels along the height of the vessel.

3. The system of claim 1, wherein the detection signal is used to determine an actual fill level of the fluid within the vessel.

4. The system of claim 3, wherein the detection signal is used to determine the actual fill level of the fluid: at a predetermined height on the vessel which corresponds to a height location of the at least two acoustic sensors on the vessel.

5. The system of claim 3, wherein the detection signal is used to determine the actual fill level at a position on the vessel which is located between the at least two acoustic sensors.

6. The system of claim 1, wherein the alert from the computerized device activates at least one of: an overfill alarm corresponding to the vessel; an emissions alarm corresponding to the vessel; or an air-gap alarm corresponding to the vessel.

7. The system of claim 1, wherein the detection signal is used to determine the presence of material different from the fluid, wherein the material includes a quantity of water.

8. The system of claim 1, wherein a plurality of detection signals are received by the computerized device over a period of time, wherein a change in fill level of the fluid is determined over the period of time.

9. The system of claim 1, wherein the computerized device is further configured to determine at least one of: a material identity of the fluid; a volume of the fluid within the vessel; and a weight of the fluid within the vessel, wherein:
   the material identity of the fluid is determined using the detection signal and measured information of the fluid to derive one or more temperature-compensated acoustic metrics of the fluid which is compared against a material properties database to determine the material identity of the fluid within the vessel;
   the volume of the fluid is determined based on a fill level derived from the detection signal and a strapping table; and
   the weight of the fluid is determined based on fluid volume, a sensed temperature of the fluid, and at least one of: a fluid identity or a fluid density.

10. The system of claim 1, further comprising at least one additional acoustic sensor positioned substantially on the exterior sidewall of the vessel in a location vertically between the at least two acoustic sensors wherein the at least one additional acoustic sensor is positioned angularly relative to the exterior sidewall of the vessel and transmits a signal into the exterior sidewall of the vessel, wherein the signal is reflected between the interface located between the inner surface of the exterior sidewall and the fluid within the vessel, and an outer surface of the exterior sidewall, wherein the signal moves vertically within the sidewall and is received at one of the at least two acoustic sensors, whereby a fill level of the fluid within the vessel is determined based on an amount of attenuation in the received signal.

11. The system of claim 10, wherein the at least two acoustic sensors transmit the longitudinal signal into the exterior sidewall of vessel to determine a thickness of the exterior sidewall of the vessel.

12. The system of claim 1, wherein the detection signal is used to determine the presence of material different from the fluid, wherein the material includes a quantity of air.

13. The system of claim 1, wherein the detection signal is used to determine the presence of material different from the fluid, wherein the material includes a structural component of the vessel.

14. The system of claim 1, wherein the detection signal is used to determine the presence of material different from the fluid, wherein the material includes a membrane of the vessel.

15. The system of claim 1, wherein the detection signal is used to determine the presence of material different from the fluid, wherein the material includes a quantity of sediment on a bottom or sidewall of the vessel.

16. The system of claim 1, wherein at least one of the at least two acoustic sensors is positioned above an upper fluid level within the vessel, and wherein at least one of the at least two acoustic sensors is positioned below the upper fluid level within the vessel.

17. The system of claim 16, wherein the detection signal of the acoustic sensor positioned above the upper fluid level within the vessel provides a detection of at least one of: a-quantity of air; a structural component of the vessel; or a membrane of the vessel, and wherein the detection signal of the acoustic sensor positioned below the upper fluid level within the vessel provides a detection of the fluid.

18. The system of claim 1, wherein the at least two acoustic sensors further comprise at least four acoustic sensors, wherein at least two of the at least four acoustic sensors are positioned proximate to a top of the vessel and at least two of the at least four acoustic sensors are positioned proximate to a bottom of the vessel.

19. The system of claim 18, wherein the at least two of the at least four acoustic sensors positioned proximate to the top of the vessel provide a high level of sensing and a high-high level of sensing, thereby providing initial and secondary warnings of an overfill situation, and the at least two of the at least four acoustic sensors positioned proximate to the bottom of the vessel provide a low level of sensing and a low-low level of sensing, thereby providing initial and secondary warnings of an underfill situation.

* * * * *